(12) United States Patent
Toda et al.

(10) Patent No.: US 7,063,890 B2
(45) Date of Patent: Jun. 20, 2006

(54) FINE PARTICLE STRUCTURE AND OPTICAL MEDIUM

(75) Inventors: Atsushi Toda, Kanagawa (JP); Yuriko Kaino, Kanagawa (JP); Hirotaka Akao, Tokyo (JP); Ko Ishimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 41 days.

(21) Appl. No.: 10/764,735

(22) Filed: Jan. 26, 2004

(65) Prior Publication Data

US 2004/0224154 A1 Nov. 11, 2004

(30) Foreign Application Priority Data

Jan. 28, 2003 (JP) .............................. 2003-018490

(51) Int. Cl.
*B32B 5/16* (2006.01)
(52) U.S. Cl. ...................... 428/402; 428/403; 428/404; 428/405; 428/407
(58) Field of Classification Search ................ 428/402, 428/403, 407, 404, 405
See application file for complete search history.

(56) References Cited

U.S. PATENT DOCUMENTS 6,456,416 B1* 9/2002 Ichimura et al. ............ 359/241
6,465,742 B1* 10/2002 Hiraoka et al. .............. 174/255
6,685,870 B1* 2/2004 Ukechi et al. ............... 264/437
6,800,709 B1* 10/2004 Aert et al. ................... 526/229
6,859,572 B1* 2/2005 Ishibashi ...................... 385/16

\* cited by examiner

*Primary Examiner*—Ieszek B. Killiman
(74) *Attorney, Agent, or Firm*—Frommer Lawrence & Haug LLP; William S. Frommer

(57) ABSTRACT

Such a structure is to be provided in that in the case where a material, such as a protective film, is coated on a fine particle accumulated layer, such as a photonic crystal, penetration of the material into gaps among the fine particles is suppressed, whereby the mechanical strength against bending stress and tensile stress is improved, and peeling and breakage of the fine particle accumulated layer are suppressed, without adverse affect on the optical characteristics, such as reflection characteristics. The fine particle structure contains a visible light absorbing material absorbing visible light as a substrate, having accumulated thereon in this order silica fine particles having a particle diameter of 290 nm as a fine particle layer for reflecting red light, silica fine particles having a particle diameter of 240 nm as a fine particle layer for reflecting green light, and silica fine particles having a particle diameter of 210 nm as a fine particle layer for reflecting blue light, and further provided thereon a polymer layer or a gelatin layer containing a polymer having a size larger than the gaps among the fine particles. The optical medium, such as a reflective type screen, further contains a diffusion film on the polymer layer or the gelatin layer.

13 Claims, 22 Drawing Sheets

[100] DIRECTION

[1000] DIRECTION

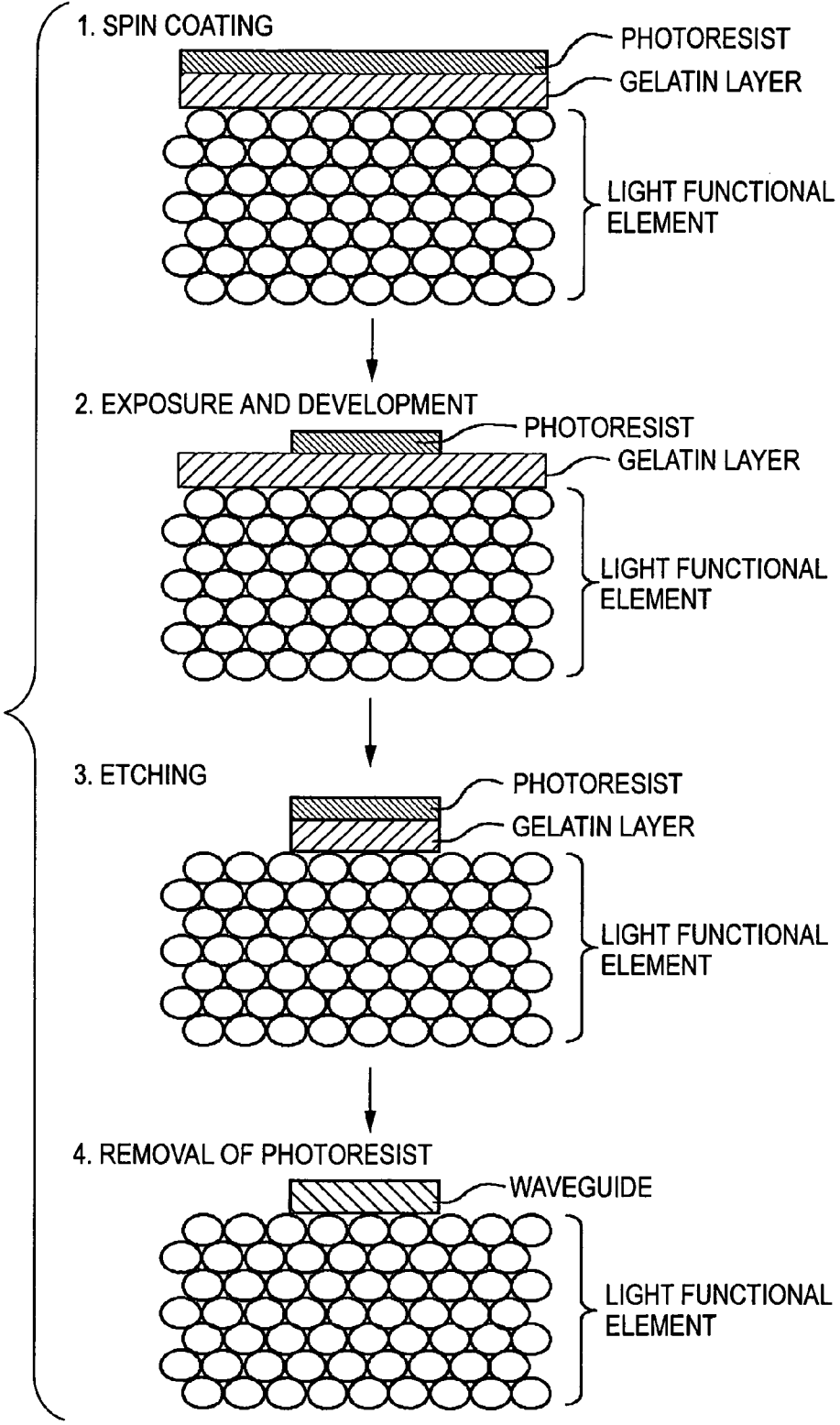

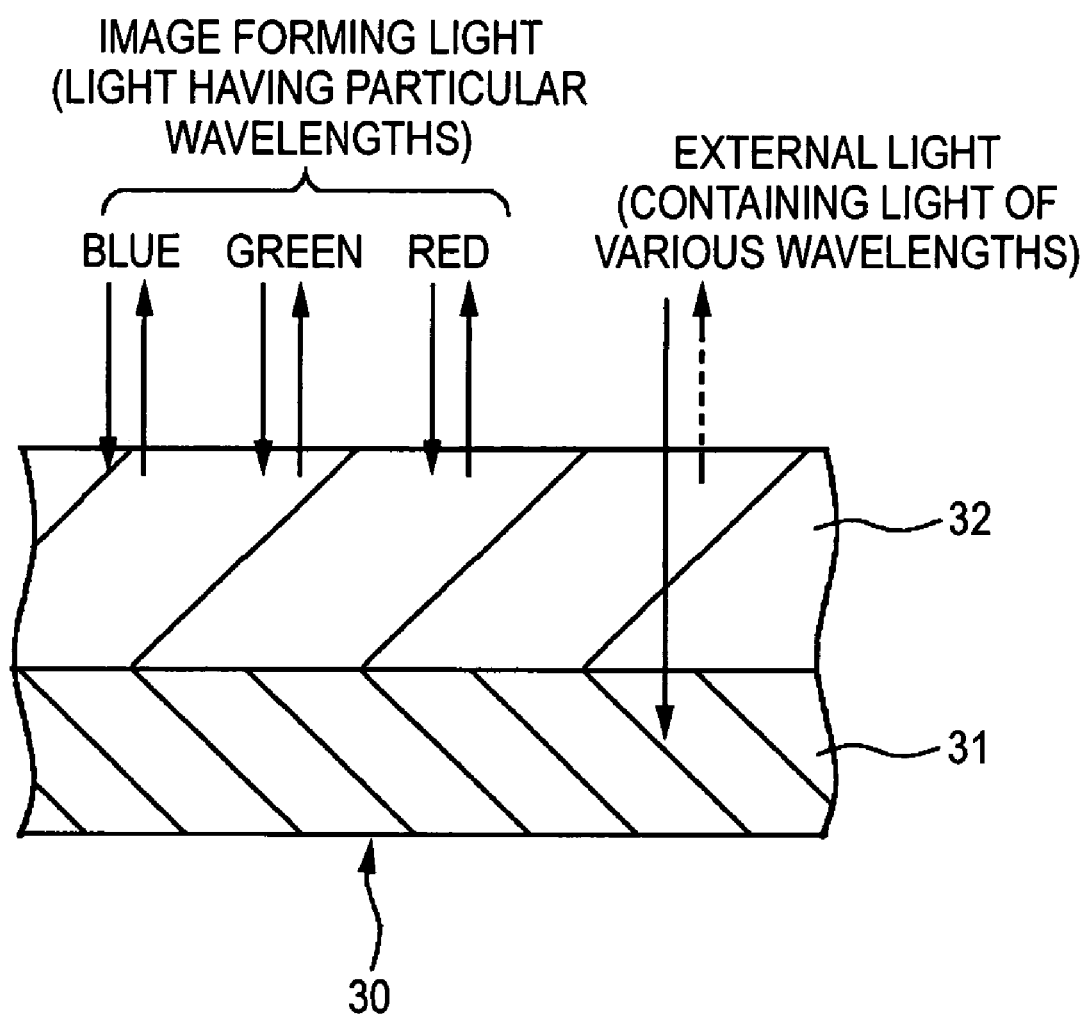

PEAK OF REFLECTIVITY AT $\lambda_0$ = 520nm,
j INDICATING NUMBER OF ACCUMULATION

SETTING DIRECTION
OF SUBSTRATE

DIPPING SUBSTRATE IN FINE
PARTICLE DISPERSION

DRAWING UP SUBSTRATE

DRYING SUBSTRATE

FINE PARTICLES ARE ARRANGED IN SELF-ORGANIZATION BY GRADUALLY ACCUMULATING FINE PARTICLES FROM FINE PARTICLE DISPERSION

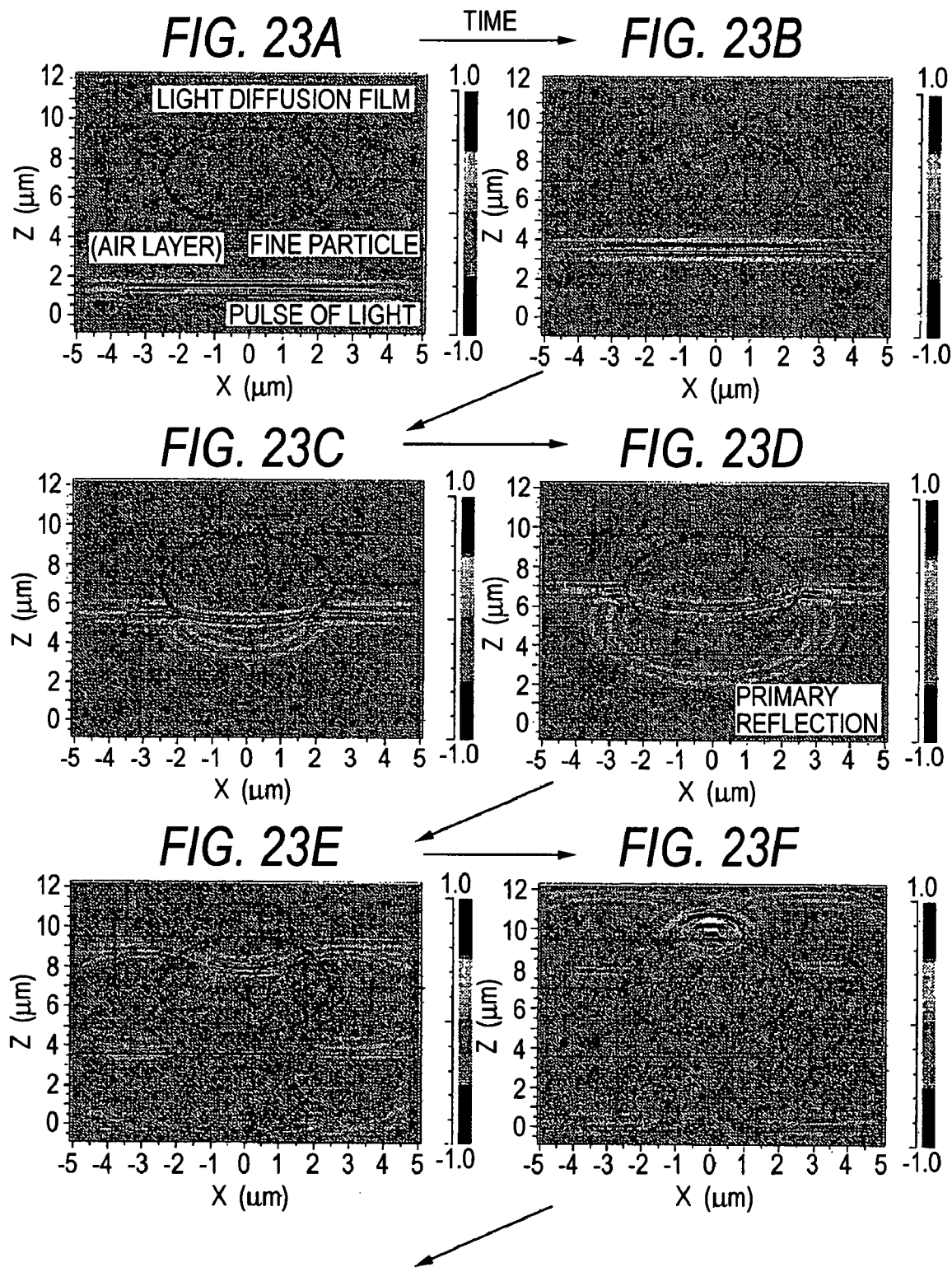

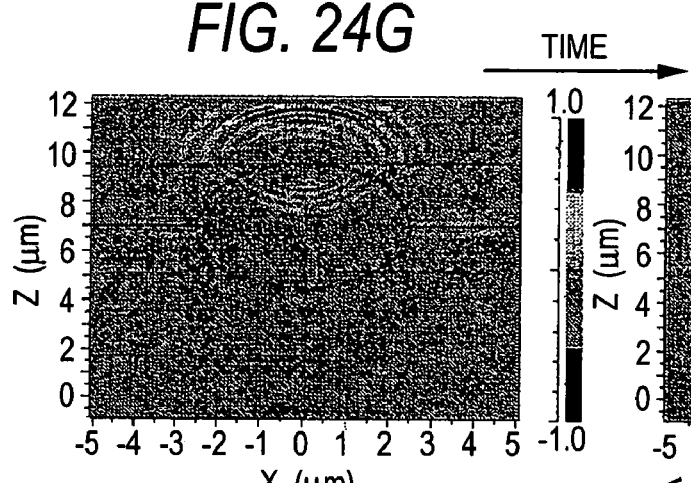
FIG. 24G
FIG. 24H
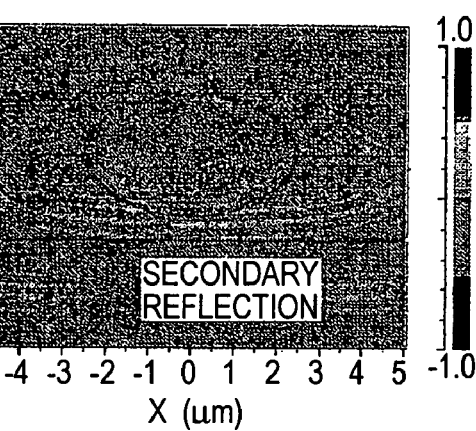
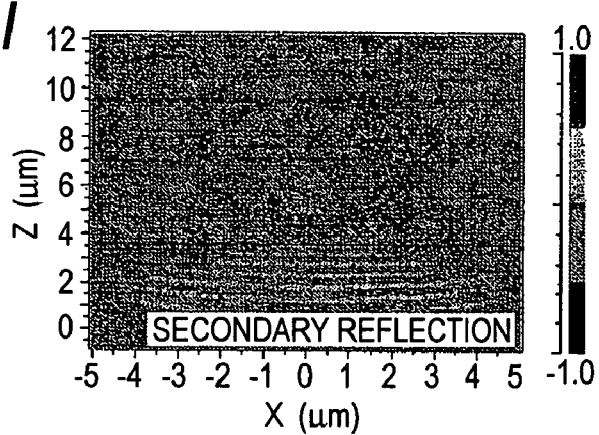
FIG. 24I

FINE PARTICLE STRUCTURE AND OPTICAL MEDIUM

BACKGROUND OF THE INVENTION

1. Field of the Invention

The present invention relates to a fine particle structure suitable for a photonic crystal layer, and an optical medium suitable for a reflective type screen suitable for projection of an image from a CRT (cathode ray tube) projector or a liquid crystal display projector.

2. Description of Related Art

As a reflective type screen for displaying an image by reflecting light projected from a projector, a white screen has been conventionally used that reflects or scatters whole light within the visible wavelength region without wavelength characteristics. In the case where light having no relation to an image is incident on a white screen, the light is reflected or scattered as similar to the image (hereinafter, such visible light other than an image projected from a projector that is incident on the screen irrelatively to the image is refereed to as external light). As a result, the external light is viewed by an observer along with the image to deteriorate the contrast of the image.

Accordingly, an image is projected from a projector onto a white screen generally in a dark room where entrance of external light is restricted. However, the fact that the image display is restricted to a dark room significantly impairs usefulness of the display system using the screen and considerably restricts the application thereof. Even in the case where an image is projected in a dark room, the contrast of the image is lowered due to external light, such as light reflected by the screen that is scattered in the dark room and is again incident on the screen, light invading from the outside, and light remaining in the dark room including emergency light, and therefore, a dark area in an image cannot be displayed as a true dark area on a screen.

Some projectors among CRT projectors and liquid crystal display projectors display various colors by projecting three primary colors of red (R), green (G) and blue (B) onto a screen and mixing the colors on the screen. Projectors of the type are restricted in reproducible color area on the chromaticity diagram due to a broad spectral full width at half maximum (FWHM) of the three primary colors of from 60 to 100 nm, and thus suffers from such a problem that accurate color tone is difficult to be reproduced.

As a result of earnest investigations on the aforementioned problem, the inventors proposed a screen having such wavelength characteristics that visible light at particular wavelengths is reflected, a process for producing the same, and an image displaying system using the screen (Japanese Patent Application No. 2001-380670). In a screen based on a preferred embodiment of the invention described in Japanese Patent Application No. 2001-380670 (hereinafter, referred to as the prior invention), a reflective layer that selectively reflects only light having narrow wavelength areas in the vicinities of the three primary colors in the visible region is provided on the surface of the screen, and an absorbing layer that absorbs visible light passing through the reflective layer is provided under the reflective layer in the thickness direction.

Upon displaying an image on the screen, light of the three primary colors, red (R), green (G) and blue (B), is projected from a projector onto the screen, and an image having various colors is formed by color mixing on the screen. The light of the three primary colors is reflected by the reflective layer provided on the screen to reach eyes of a viewer, and thus perceived as an image.

The external light contains light having various wavelengths, and the most part thereof is light outside the wavelength regions in the vicinities of light of the three primary colors, which can be reflected by the reflective layer. Therefore, even in the case where the external light is incident on the screen, the most part thereof is not reflected by the reflective layer but is absorbed by the absorbing layer, whereby the external light substantially does not reach eyes of a viewer along with the image. As a result, deterioration in contrast due to the external light is significantly suppressed, and therefore, a dark area in an image can be displayed as a true dark area on the screen. Furthermore, an image can be displayed on the screen outside a dark room, for example, in a bright room and out of doors.

The screen functions as a filter for selecting light depending on wavelength by itself according to the aforementioned mechanisms, and accordingly, the color reproducibility of an image is also improved owing to the following reasons. The spectral full width at half maximum of light of the three primary colors emitted from a CRT projector and a liquid crystal display projector is broad, as having been described. However, when the light is incident on the screen, only light of the three primary colors and the narrow wavelength regions in the vicinities thereof is selectively reflected, but other light is wholly absorbed. Consequently, the light of the three primary colors thus reflected by the screen is improved in color purity with a narrow spectral full width at half maximum. Therefore, the reproducible color area of an image formed by mixing the light of the three primary colors thus reflected is enhanced, and the color tone is more accurately reproduced.

FIG. 12 is a schematic cross sectional view for showing the principal of selection of an image and external light by a reflective type screen 30 according to a preferred embodiment of the prior invention. The reflective type screen 30 has a reflective layer 32 that selectively reflects light having narrow wavelength regions in the vicinities of light of the three primary colors, red (R), green (G) and blue (B), in the visible region, and an absorbing layer 31 for absorbing visible light passing through the reflective layer under the reflective layer in the thickness direction.

Upon displaying an image on the screen 30, light of the three primary colors, red (R), green (G) and blue (B) from a projector etc., is projected onto the screen, and an image having various colors is formed by color mixing on the screen. The light of the three primary colors is reflected by the reflective layer 32 to reach eyes of a viewer, and thus perceived as an image.

The external light contains light having various wavelengths, and the most part thereof is light outside the wavelength regions in the vicinities of the three primary colors, which can be reflected by the reflective layer 32. Therefore, even in the case where the external light is incident on the screen 30, the most part thereof is not reflected by the reflective layer 32 but is absorbed by the absorbing layer 31, whereby the external light less reaches eyes of a viewer along with the image. As a result, deterioration in contrast due to the external light is significantly suppressed, and therefore, clearness of an image is improved and a dark area in an image can be displayed as a true dark area on the screen. Furthermore, an image can be displayed on the screen outside a dark room, for example, in a bright room and out of doors.

FIGS. 13A and 13B are schematic cross sectional views showing specific examples of the structure of the reflective layer that selectively reflects light having a particular wavelength.

The structure shown in FIG. 13A contains a substrate 21 having formed thereon a dielectric layer 35 containing a multilayer film formed by accumulating films 33 and 34 alternately, which are formed with two kinds of dielectric materials having different refractive indices n, by which only light having a particular wavelength $\lambda_0$ is selectively reflected through the interference effect. The thickness L of the respective layers is $L=i\lambda_0/4n$, where n ($n_1$ or $n_2$) represents the refractive index, and i represents a positive integer, which is 1 herein.

FIG. 14 is a graph showing calculation results of reflection spectrum of the dielectric layer 35 estimated by the effective Fresnel coefficient method. In the calculation, it is assumed that the refractive index $n_1$ of one of the dielectric materials is 1.2, the refractive index $n_2$ of the other dielectric material is 1.8, and $\lambda_0$ is 520 nm, and the calculation is made for the number of accumulation j of from 1 to 5, respectively. It is understood from FIG. 14 that when the number of accumulation j is increased, the reflectivity R at $\lambda_0$ is increased, and when the dielectric layers are accumulated by 5 layers, the reflectivity R reaches 90% or more. However, the full width at half maximum of the reflectivity at $\lambda_0$ is as large as about 200 nm.

In the structure shown in FIG. 13B, spherical fine particles 9 having been classified in particle diameter are arranged on a substrate 21, and plural layers 40 formed with the fine particles are accumulated.

FIG. 15 is a graph showing a reflection spectrum of a film formed by accumulating layers of silica fine particle having a particle diameter of 280 nm formed by the self-organization described later. The reflection spectrum is measured in such a manner that white light is perpendicularly incident on the surface of the fine particle layer, and the spectrum of the light reflected perpendicularly to the surface of the layer is measured. It is understood from FIG. 15 that the reflectivity becomes maximum at a wavelength of 625 nm with a relatively high reflectivity of 54%, and the full width at half maximum of the peak is as narrow as about 30 nm.

It has been known that the Bragg's law is effective on interference of an X-ray by atoms or molecules forming a crystal. It has also been known that light is generally liable to be reflected by a periodical arrangement structure of fine particles repeated at a distance (pitch) nearly equal to the wavelength thereof. Accordingly, assuming that the relationship similar to conditions of the Bragg's law is effective in reflection of visible light on a silica fine particle layer, the wavelength $\lambda_0$ of light that is most liable to be reflected and the distance (pitch) d of the fine particle layers have the relationship $k\lambda_0=2n_3 d$, where $n_3$ represents a mode refractive index of the constituent material of the fine particles, and k represents a positive integer.

The arrangement structure of fine particles is not conclusive, but the most frequent arrangement structure of rigid spheres, such as silica fine particles, is the close packed structure. The close packed structure includes the cubic close packed structure, in which three fine particle layers (A layer, B layer and C layer) having different arrangement positions of particles on the plane are repeated, and the hexagonal close packed structure, in which two fine particle layers (A layer and B layer) having different arrangement positions of particles on the plane are repeated. The distance (pitch) d between the adjacent two fine particle layers is common to the structures and has the following relationship to the diameter D of the fine particles, $d=(2\times 3)^{1/2}D/3$.

It is assumed that silica fine particles exhibit the close packed structure, and in the aforementioned two equations, substitutions of the particle diameter of the silica fine particles of 280 nm for D, the mode refractive index of the silica fine particles of 1.36 $n_3$, and 1 for k provide the most reflexible wavelength $\lambda_0$ of 622 nm, which well agrees with the actual value $\lambda_0$ of 624.5 nm.

It is considered from the aforementioned discussions that the silica fine particle layer formed by the self-assemble forming manner shown in FIG. 13B exhibits, in at least part thereof, a periodical particle arrangement having the close packed structure, which is the main factor of the reflection of light with a central wavelength of 624.5 nm.

From the practical standpoint, it is important, rather than the structure itself, that silica fine particles form such a reflective layer that has a reflection spectrum characteristic having a sharp peak with a narrow full width at half maximum shown in FIG. 15 owing to the structure formed by the self-assemble forming manner.

According to the model calculation where the close packed structure is simplified, a reflective layer having a sharp peak near 625 nm with a full width at half maximum of about 30 nm is formed by using silica fine particles having a refractive index of 1.36 and a particle diameter of 280 nm, which well agrees with the experimental value. According to the calculation, light having a wavelength of 625 nm thus being incident penetrates only to the eighth to fifteenth layer from the surface, but the most of the light is reflected by these layers to turn over the traveling direction thereof, and in particular, the boundary of reflection is around the eleventh layer. It is understood from the result that it is sufficient to provide about eleven layers for forming a light reflective layer with silica fine particles.

While the layer for reflecting red light (wavelength: 625 nm) has been described, layers for reflecting green light and blue light can be similarly produced. It is considered from the aforementioned discussions that the diameter of fine particles is proportional to the wavelength of light to be reflected, and therefore, fine particles having an appropriate diameter are selected depending on the wavelength of light to be reflected. That is, silica fine particles having a particle diameter of 235 nm may be used for green light (wavelength: 525 nm), and silica fine particles having a diameter of 212 nm may be used for blue light (wavelength: 475 nm).

FIG. 16A is a cross sectional view showing a basic structure of a reflective type screen reflecting only light of the three primary colors derived from the aforementioned discussions. Silica fine particles having a particle diameter of 280 nm are accumulated by 11 layers as a fine particle layer 2 for reflecting red light, silica fine particles having a particle diameter of 234.5 nm are accumulated thereon by 11 layers as a fine particle layer 3 for reflecting green light, and silica fine particles having a particle diameter of 212 nm are further accumulated thereon by 11 layers as a fine particle layer 4 for reflecting blue light, so as to form such a reflective layer that reflects only light of the three primary colors but transmits light of other wavelengths.

FIG. 16B is a cross sectional view showing a structure where the accumulation order of the reflective layers 2 to 4 is inverted. Since light having a shorter wavelength is liable to be scattered, it is preferred that the blue light reflective layer 4 is as the uppermost layer as in the arrangement of FIG. 16A for reducing scattered light. However, the fine particle layer having a smaller particle diameter is laid over the fine particle layer having a larger particle diameter in the arrangement of FIG. 16A, and therefore, the particle arrangement of the upper layer is liable to be disturbed by receiving influence of the particle arrangement of the lower layer. In the arrangement of FIG. 16B, on the other hand, the fine particle layer having a larger particle diameter is laid over the fine particle layer having a smaller particle diameter, and therefore, the particle arrangement of the upper layer is relatively hard to receive influence of the particle arrangement of the lower layer. Therefore, the arrangement of FIG. 16B is preferred for forming a regular particle arrangement.

A visible light absorber 1 absorbing visible light is used as a substrate. Specifically, for example, a black substrate formed with carbon is preferably used. In the case where the thickness of the visible light absorbing material 1 is increased, the mechanical strength thereof is increased, but the flexibility thereof is reduced. The thickness is preferably from 20 to 500 µm for balancing the mechanical strength and the flexibility, and for example, a thickness of about 50 µm is more preferred. A substrate having a thickness of about 50 µm provides a screen that is hardly broken but is easily wound owing to high flexibility. The area of the screen is appropriately selected depending on purposes.

The screen functions as a filter for selecting light depending on wavelength by itself according to the aforementioned mechanisms, and accordingly, the color reproducibility of an image is also improved by using the screen 30 owing to the following reasons. The spectral full width at half maximum of light of the three primary colors emitted from a CRT projector and a liquid crystal display projector is broad, as having been described. However, when the light is incident on the screen 30, only light of the three primary colors and the narrow wavelength regions in the vicinities thereof is selectively reflected by the reflective layer 32, but other light is wholly absorbed by the absorbing layer 31. Consequently, the light of the three primary colors thus reflected by the screen is improved in color purity with a narrow spectral full width at half maximum. Therefore, the color tone of the image formed by mixing light of the three primary colors is more accurately reproduced.

FIG. 17 is a graph showing a chromaticity diagram demonstrating the fact that the color reproducibility of an image reproduced by a liquid crystal display (LCD) projector and a DLP (digital light processing) projector is improved by using the screen according to the prior invention.

In the projectors, the spectral full width at half maximum of light of the three primary colors is as large as from 60 to 100 nm to provide poor color purity since wavelength selection of the light of the three primary colors is attained by using color filters. Therefore, the color reproducible area is restricted upon projecting onto a white screen as shown in FIG. 17.

In the case where a screen according to the prior invention shown in FIGS. 16A and 16B is used, the spectral full width at half maximum of light of the three primary colors thus reflected by the screen is narrowed to about 30 nm, whereby the color reproducible area is enhanced as shown in FIG. 17.

Various methods have been reported as a method for accumulating a fine particle aggregate having fine particles that are three-dimensionally regularly and periodically arranged through aggregation of the fine particles by self-assemble forming manner, so as to form a fine particle layer constituting the red light reflective layer and the like (P. Jiang, et al., Chem. Mater., vol. 11, p. 2132 (1999), and Y. Xia, et al., Adv. Mater., vol. 12(10), p. 693 (2000)).

One example of the methods is a draw up method. In the draw up method, as shown in FIGS. 18A to 18D, for example, a fine particle dispersion 11 containing fine particles dispersed in a dispersion medium is put in a dispersion bath, into which a substrate 1 having good affinity with the fine particle is perpendicularly inserted, and then the substrate 1 is drawn up from the fine particle dispersion 11. Upon drawing up the substrate, an appropriate amount of the fine particle dispersion is transferred to the surface of the substrate. Thereafter, self-assembly of the fine particles occurs during evaporation of the dispersion medium from the fine particle dispersion thus transferred, so as to form a fine particle aggregate having fine particles regularly arranged on the substrate (K. Nagayama, J. Soc. Powder Technol. Japan, vol. 32, p. 476 (1995), J. D. Joannopoulos, Nature, vol. 414(15), p. 257 (2001), and Yong-Hong Ye, et al., Appl. Phys. Lett., vol. 78(1), p. 52 (2001)).

Another example of the methods is a spontaneous sedimentation method. In the spontaneous sedimentation method, as shown in FIG. 19, a fine particle dispersion 11 is prepared by using a dispersion medium 10 in the similar manner as in the draw up method, and then a substrate 1 is still stood at the bottom of the fine particle dispersion. Fine particles 9 gradually sediment on the substrate owing to the weight thereof to form a fine particle aggregate having fine particles regularly arranged (H. Miguez, et al., Adv. Mater., vol. 10(6), p. 480 (1998)). Accordingly, the spherical fine particles 9, such as silica fine particles, are gradually accumulated on the substrate 1 from the dispersion by spontaneous sedimentation by gravity and by reduction of the amount of the dispersion medium by evaporation.

In still another example of the methods, a microcell formed by sandwiching a spacer larger than fine particles is perpendicularly inserted into a fine particle dispersion and still stood therein. The fine particle dispersion is charged into the cell by capillarity. Thereafter, self-assembly of the fine particles occurs during the process of evaporating the dispersion medium from the fine particle dispersion, so as to form a fine particle aggregate having fine particles regularly arranged in the cell (B. Gates, D. Qin and Y. Xia, Adv. Mater., vol. 11, p. 466 (1999)).

FIG. 20 is a schematic cross sectional view of a practical reflective type screen having a light diffusion film as a light diffusing layer 7 provided as the uppermost layer on a fine particle layer 40 formed according to the aforementioned manner. The light diffusion film 7 may be replaced, for example, by a microlens film having microlens arrays two-dimensionally formed on the surface thereof.

The reflective type screen selectively reflects only light of the three primary colors, red, green and blue, of a projector by utilizing the Bragg reflection of a photonic crystal obtained by regularly arranging fine particles and also makes black color pure by absorbing the external light by the substrate. The screen necessarily has a mechanical strength in a certain extent. In the case where the screen is wound, it necessarily has a strength against bending, tensility and compression, and also it necessarily has such a strength that withstands abrasion and press on the surface within the range where the screen is ordinarily used. Therefore, it is necessary to provide a photonic crystal that has the mechanical strength.

In some cases, the screen requires a light diffusing layer 7, such as a diffusion film on the surface as shown in FIG. 20. The light diffusing layer 7 is provided to relax the directivity to improve the viewing angle characteristics, whereby an image can be viewed in an oblique direction, and to avoid a hot spot, which is such a phenomenon that a light source of a projector is directly viewed by mirror reflection.

However, the fine particle accumulated layer is poor in mechanical strength against bending stress, tensility and compression stress to cause a problem in reliability due to peeling and breakage of the crystal. In the case shown in FIG. 21 where a protective film 6 is provided by coating an ordinary polymer material on a fine particle accumulated layer 40 in order to solve the problem, there are many cases where a large amount of the polymer 6A penetrates into gaps among the fine particles. In the case where the polymer penetrates into gaps among the fine particles constituting the photonic crystal, the optical characteristics, such as reflection characteristics and diffraction characteristics, thereof are influenced by displacing the difference in refractive index between the fine particles and the air by the difference in refractive index between the fine particles and the polymer.

A diffusion film 7 is provided on the photonic crystal layer 40 for improving the viewing angle characteristics, such as reduction of the directionality of the screen, and for avoiding the hot spot. In the case shown in FIG. 20 where an air layer 50 having a low refractive index is present between the photonic crystal 4 and the diffusion film 7, the external light is reflected on the back surface of the diffusion film to deteriorate purity of black color. Results obtained by simulating the phenomenon by the FDTD method (finite difference time domain method) are shown in FIGS. 22 to 25 and described below.

In a model of the diffusion film 7 shown in FIG. 22 where a bead 9 having a diameter of 5 μm is buried in a film 7 by half, a pulse of light 51 having a wavelength 520 nm is perpendicularly incident on the front surface of the film (plane wave). The refractive indices of the bead 9 and the film 7 are both 1.6. A monitor 52 is provided to calculate the intensity of light passing through the monitor.

The calculation results in this case with lapse of time are shown in FIGS. 23A to 24I. It is understood from the figures that the light passing the film 7 is spread as a spherical wave (diffusibility). The major reflection wave appears twice. The primary reflection wave (FIG. 23D) mainly contains a component of light that is reflected on the surface of the particle and returns as a spherical wave. The secondary reflection wave is a component of light that is reflected on the back surface of the film and returns, which is a spherical wave (FIG. 24G) in the particle owing to the lens effect of the particle, but becomes a plane wave (FIGS. 24H and 24I) in the exterior thereof, and thus, light with directionality returns.

FIG. 25 is a graph showing the light intensity calculated at the position of the monitor 52 as the ordinate with respect to the product of time T and the velocity of light c as the abscissa. It is found from the results that the intensity of light reflected by the diffusion film is about 8% of the incident light, and about 62% thereof are the secondary reflection wave. Therefore, the reflection can be suppressed by about 38% if the gap between the diffusion film and the photonic crystal can be filled with a material having the similar refractive index.

Accordingly, it is suitable as shown in FIG. 26 that an ordinary polymer material is coated as an adhesive material layer 6B directly on a photonic crystal, and using it as an intermediate layer, a diffusion film 7 is closely adhered thereon. In this case, however, the polymer material 6B penetrates into the photonic crystal to exhibit adverse affect on the characteristics of the screen, such as decrease of the reflectivity of the three primary colors (Bragg reflection).

The discussions herein have been made mainly for a reflective type screen, but the same problem occurs in general optical functional elements using a photonic crystal. In particular, the same problem occurs in the case where a polymer material is coated directly on a photonic crystal for forming a protective film or a waveguide.

SUMMARY OF THE INVENTION

An object of the invention is to provide such a structure in that in the case where a material, such as a protective film, is formed by coating on a fine particle accumulated layer, such as a photonic crystal, penetration of the material into gaps among the fine particles is suppressed, whereby a sufficient mechanical strength against bending stress and tensile stress is obtained, and peeling and breakage of the fine particle accumulated layer can be reduced, without adverse affect on the optical characteristics, such as reflection characteristics.

The invention relates to a fine particle structure containing a fine particle accumulated layer having fine particles arranged and accumulated, having provided thereon a layer containing a molecule having a size larger than gaps among the fine particles, and also relates to an optical medium having the fine particle structure.

According to the invention, in the case where the molecular layer as a protective film or the like is formed on the fine particle accumulated layer, such as a photonic crystal, the molecular layer does not penetrate in a large amount into gaps among the fine particles because the material of the molecular layer has a size larger than the gaps among the fine particles. Therefore, a sufficient mechanical strength against bending stress and tensile stress can be obtained, and peeling and breakage of the fine particle accumulated layer can be reduced, without adverse affect on the optical characteristics, such as reflection characteristics.

BRIEF DESCRIPTION OF THE DRAWINGS

FIG. 11 is a flow chart showing a production process of an optical functional element according to an example of the invention.

FIG. 12 is a schematic cross sectional view showing the principal, in which an image and external light are discriminated with a reflective type screen according to a preferred embodiment of the prior invention.

FIGS. 23A to 23F are light intensity distribution diagrams upon monitoring reflected light upon measuring reflection with a model for measuring reflection.

FIGS. 24G to 24I are light intensity distribution diagrams upon monitoring reflected light upon measuring reflection with a model for measuring reflection.

DESCRIPTION OF THE PREFERRED EMBODIMENTS

Figure 1A:
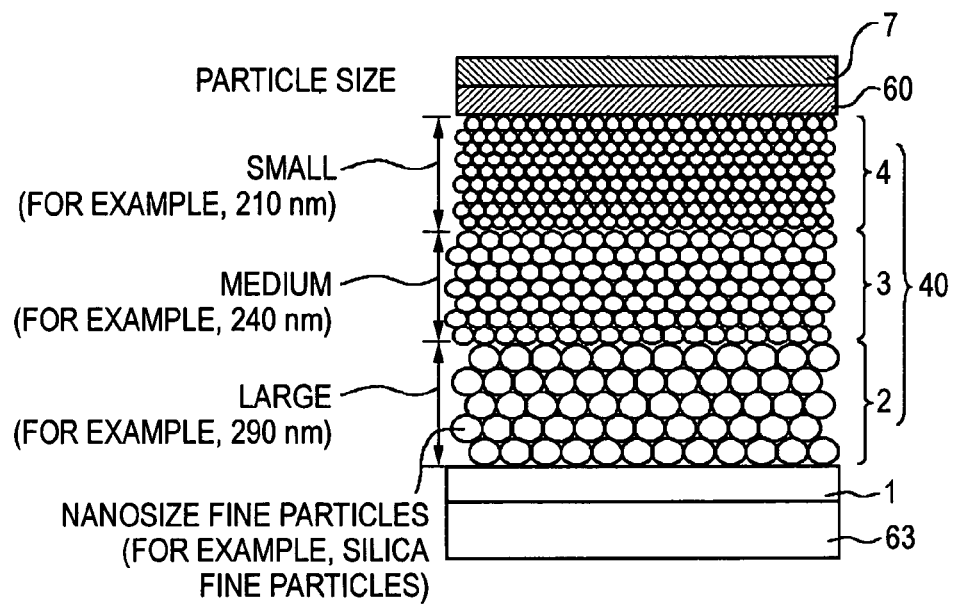
FIGS. 1A and 1B are enlarged schematic cross sectional views showing important parts of reflective type screens according to an embodiment of the invention.

It is preferred in the fine particle structure according to the invention that the fine particle accumulated layer is a photonic crystal layer containing the fine particles regularly arranged, having coated thereon a polymer substance having a length or a size larger than the gaps among the fine particles.

In this case, it is preferred that the fine particles have a uniform size and are regularly arranged to form the photonic crystal layer.

It is preferred that the size of the gaps is $$2(\sqrt{2}-1)R \qquad \text{[equation 2]}$$

or 2R, wherein R represents a radius of the fine particles.

It is possible that the polymer substance contains a straight polymer, a linear polymer or a helix polymer, and the length or the size is a length in a major length direction of the polymer substance or a length in a minor length direction of the polymer substance.

It is possible that the polymer substance is in a coil form, and the length or the size is a length in a major length direction of the coil or a length in a minor length direction of the coil.

It is possible that the polymer substance contains a network polymer or a gel polymer, and the length or the size is a size of the network in a spreading direction.

It is preferred that the polymer substance is gelatin.

It is preferred that the optical medium according to the invention has a fine particle structure having the polymer substance layer, and it is also preferred that the molecular layer is provided as a protective film of a reflective type screen.

It is preferred that the molecular layer is provided between a light diffusing layer and the fine particle accumulated layer as a photonic crystal layer of a reflective type screen, and no air layer intervenes among them.

In the case where the invention is applied to a reflective type screen, the photonic crystal layer can be directly covered with the polymer substance, and thus, there is no possibility that an air layer intervenes between the light diffusing layer, such as a diffusion film, and the photonic crystal layer. As a result, reflection of light on the back surface of the diffusion film is suppressed, and even in the case where external light having no relation to an image is incident on the screen, the contrast of the image is not deteriorated to provide an image having pure black color. Accordingly, it is not necessary that an image is projected in a dark room, but the contrast is not deteriorated under an ordinary fluorescent lamp or out of doors. At the same time, the mechanical strength against bending stress and tensile stress is improved, and peeling and breakage of the fine particle accumulated layer are reduced, so as to provide a screen with high reliability.

In the case where the optical medium is constituted as a light functional element, it is possible that the molecular layer is formed as a protective film or as a waveguide.

In the case where the invention is applied to a light functional element of a photonic crystal, the mechanical strength against bending, tensile and compression stress can be improved with substantially no change in light functional characteristics, or a polymer waveguide can be formed with substantially no change in light functional characteristics.

Preferred embodiments of the invention will be described below with reference to the drawings.

As described in the foregoing, in a photonic crystal having fine particles regularly arranged, there are gaps among the fine particles, and in the case where a polymer material is coated as a protective film on the photonic crystal, there are cases where a large amount of the material penetrates into the gaps. In the case where a large amount of the polymer material penetrates into the gaps, the optical characteristics may be influenced since the refractive index is changed in the gaps among the fine particles. Under the circumstances, the invention is to suppress the penetration of the polymer material into the gaps by the following manners.

Figure 2A:
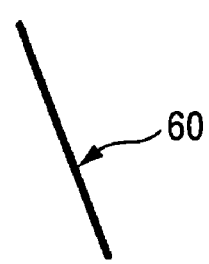
FIGS. 2A, 2B and 2C are schematic illustrations showing polymer molecules used for adhesion of a diffusion film according to an embodiment of the invention.
Figure 2B:
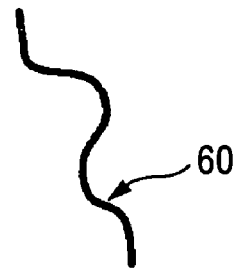
Figure 2C:
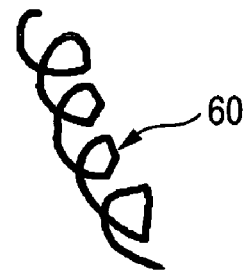

One of the manners is to coat a material containing a molecule having a size larger than the gaps among the fine particles, whereby the penetration thereof into the gaps is suppressed. In the case of a chain polymer (A) extending straight, a linear polymer (B) or a helix polymer (C) as shown in FIGS. 2A to 2C, for example, a sufficient effect can be obtained when the length in the major diameter direction of the polymer 60 is larger than the distance of the gaps among the fine particles. In the case where the length in the minor diameter direction of the polymer 60 is smaller than the distance of the gaps, there are some polymer molecules penetrating into the gaps, but the probability thereof is low, and a significant proportion of the polymer does not penetrate into the gaps. However, it is more preferred that the length in the minor diameter direction of the polymer is larger than the distance of the gaps among the fine particles, whereby the most of the polymer does not penetrate into the gaps. For example, polymethyl methacrylate having a length of 300 nm or less (which is equivalent to f described later) may be used as a polymer.

Figure 3:
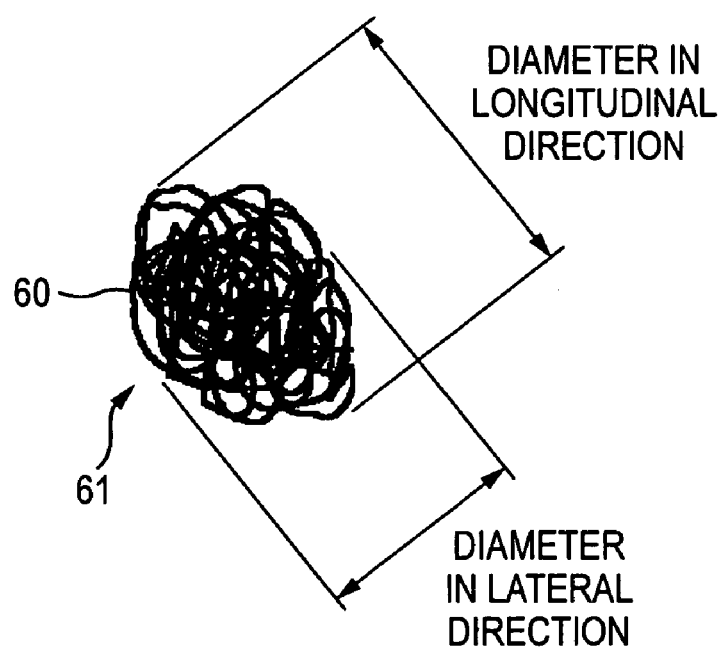
FIG. 3 is a schematic illustration showing another polymer molecule used for adhesion of a diffusion film according to an embodiment of the invention.

In the case of a coil 61 of the polymer 60 entangled as shown in FIG. 3, an effect is obtained when the diameter in in the major diameter direction of the coil is larger than the distance of the gaps among the fine particles. It is more preferred that the diameter in the minor diameter direction of the coil 61 is larger than the distance of the gaps among the fine particles, whereby the most of the polymer does not penetrate into the gaps. The term "distance of the gaps" herein means the largest slant distance or the maximum slant distance in the gaps.

Figure 4A:
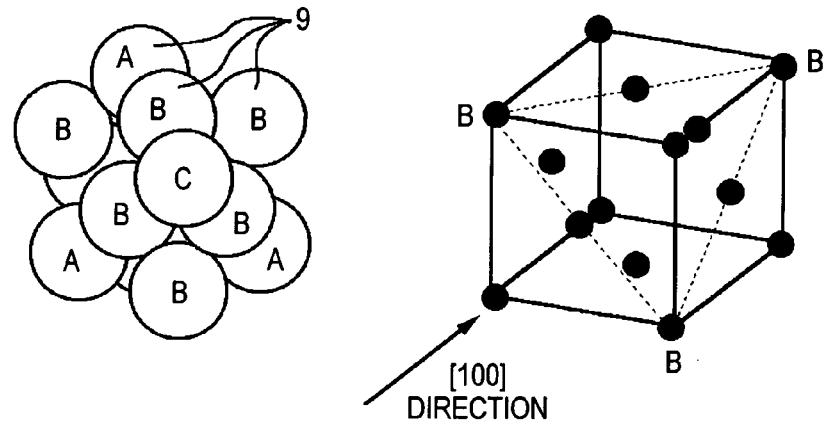
FIGS. 4A and 4B are schematic illustrations showing structures of a fine particle layer according to an embodiment of the invention.
Figure 4B:
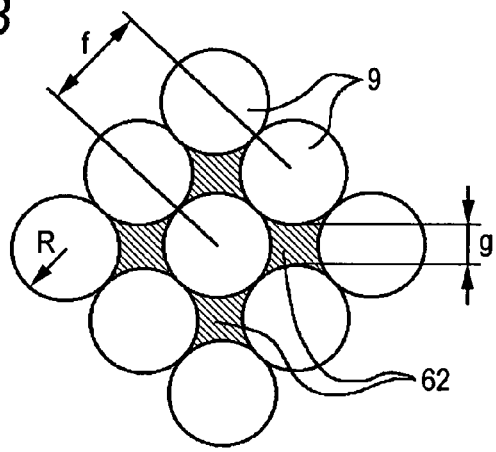

FIG. 4A shows the face centered cubic lattice, which is one of the close packed structures of fine particles 4, and FIG. 4B shows the arrangement of fine particles viewed from the [100] direction thereof. In general, fine particles form a close packed structure by the self-assemble forming manner, and in the case of the face centered cubic lattice, the distance viewed from the [100] direction is the largest.

Assuming that the radius of the fine particles is represented by R, in the gaps 62 shown with hatching, the largest distance f of the gaps is f=2R, and the maximum distance g is $$g=2(\sqrt{2}-1)R \qquad \text{[equation 3]}$$

Therefore, in the case where the size h of the polymer 60 is h>g, i.e., the distance of the gaps is defined as g, the penetration can be prevented, and more preferably, in the case where the size h is h>f, i.e., the distance of the gaps defined as f, the penetration can be further effectively prevented.

Figure 5:
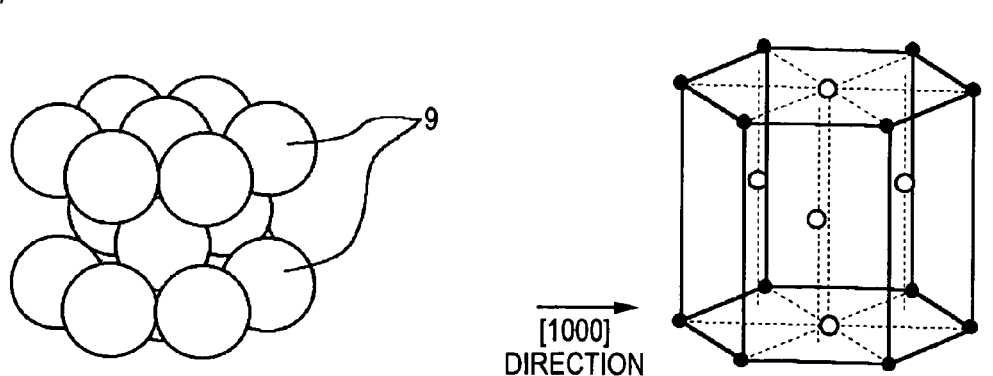
FIG. 5 is a schematic illustration showing another structure of a fine particle layer according to an embodiment of the invention.
Figure 6:
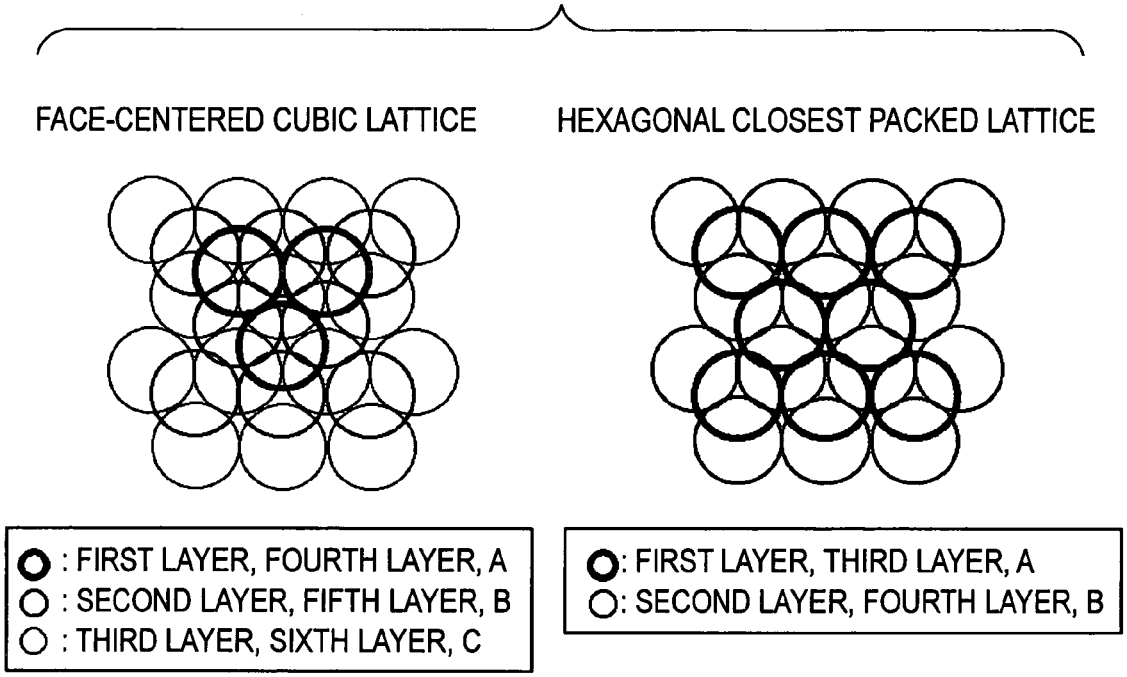
FIG. 6 is a schematic illustration showing a state of accumulation of a fine particle layer according to an embodiment of the invention.

FIG. 5 shows the hexagonal close packed structure, which is another of the close packed structures. In this case, the same arrangement as that viewed from the [100] direction of the face centered cubic lattice is found in the [1000] direction. This is because as shown in FIG. 6, the face centered cubic lattice having an arrangement of plane A, plane B, plane C, plane A, plane B . . . in this order is analogous to the hexagonal close packed lattice having an arrangement of plane A, plane B, plane A, plane B . . . in this order. Therefore, the size of the polymer corresponding to the gaps among the fine particle in this case may be under the same conditions as in the case of the face centered cubic lattice.

The polymer may not be necessarily a chain polymer, a linear polymer, a helix polymer or a coil, but may be a network form, such as agar and gelatin, or may form gel. In these cases, an effect can be obtained when the size of the network in a spreading direction is larger than the distance of the gaps among the fine particles.

The case where a photonic crystal is applied to a reflective type screen for front projection will be described. A specific structure is shown in FIGS. 1A and 1B.

Figure 20:
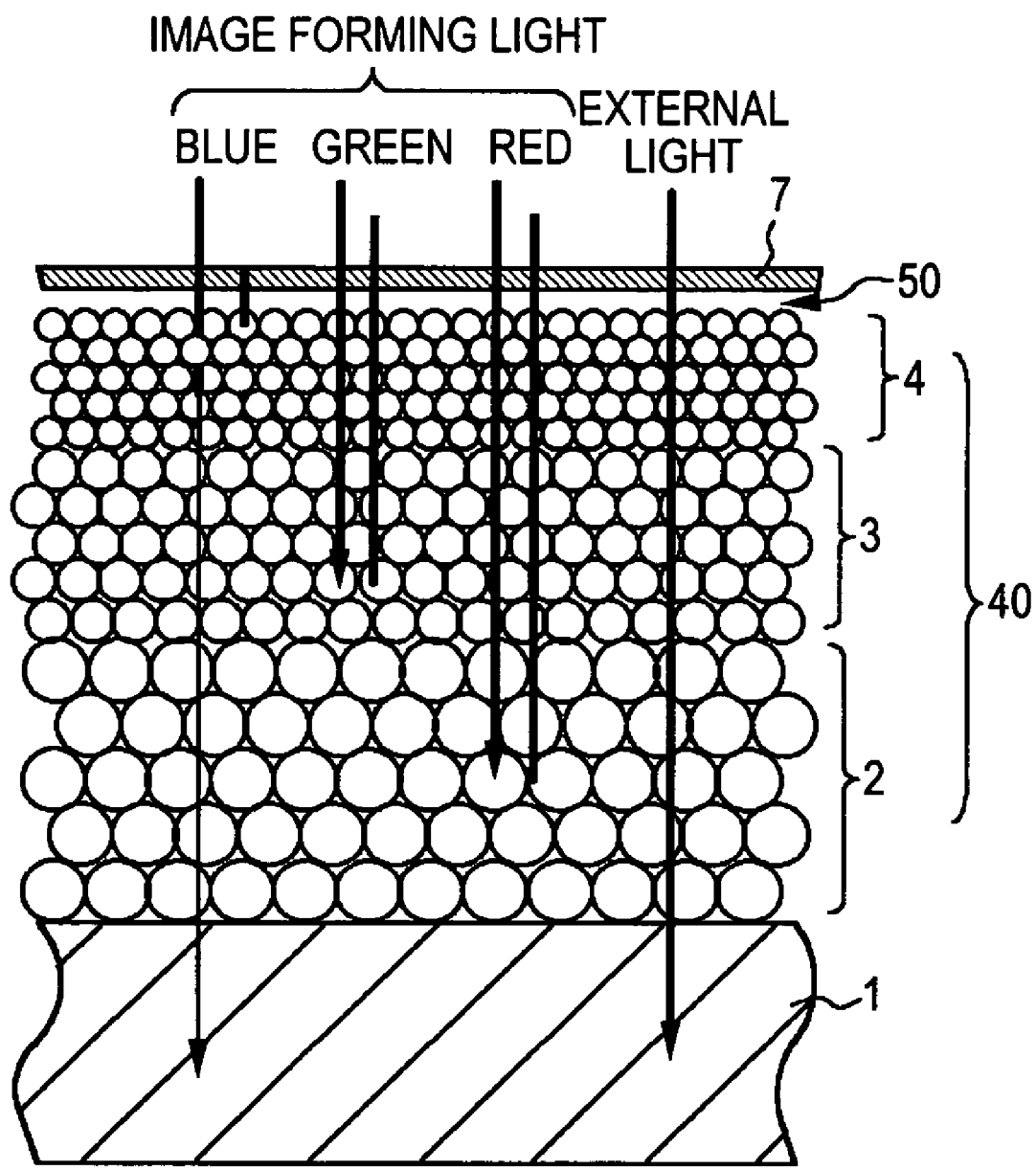
FIG. 20 is an enlarged schematic cross sectional view showing an important part of a reflective type screen.
Figure 21:
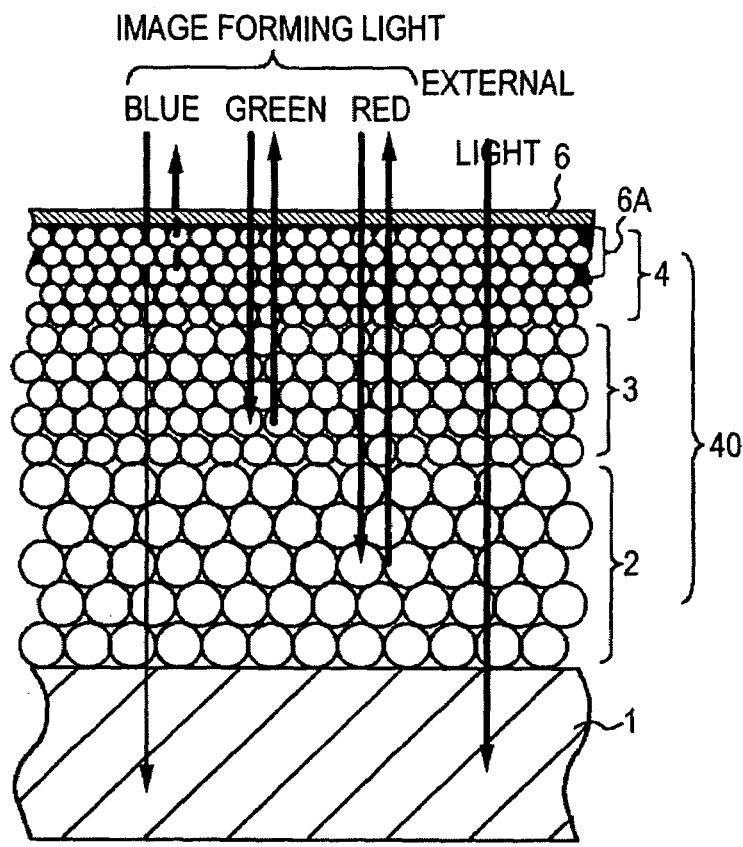
FIG. 21 is an enlarged schematic cross sectional view showing an important part of another reflective type screen.
Figure 22:
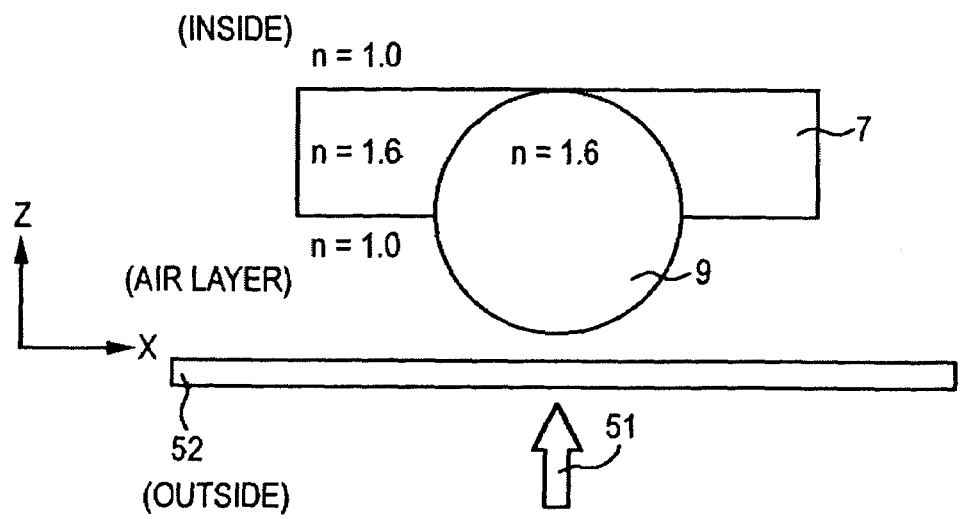
FIG. 22 is a schematic illustration showing a model for measuring reflection.
Figure 25:
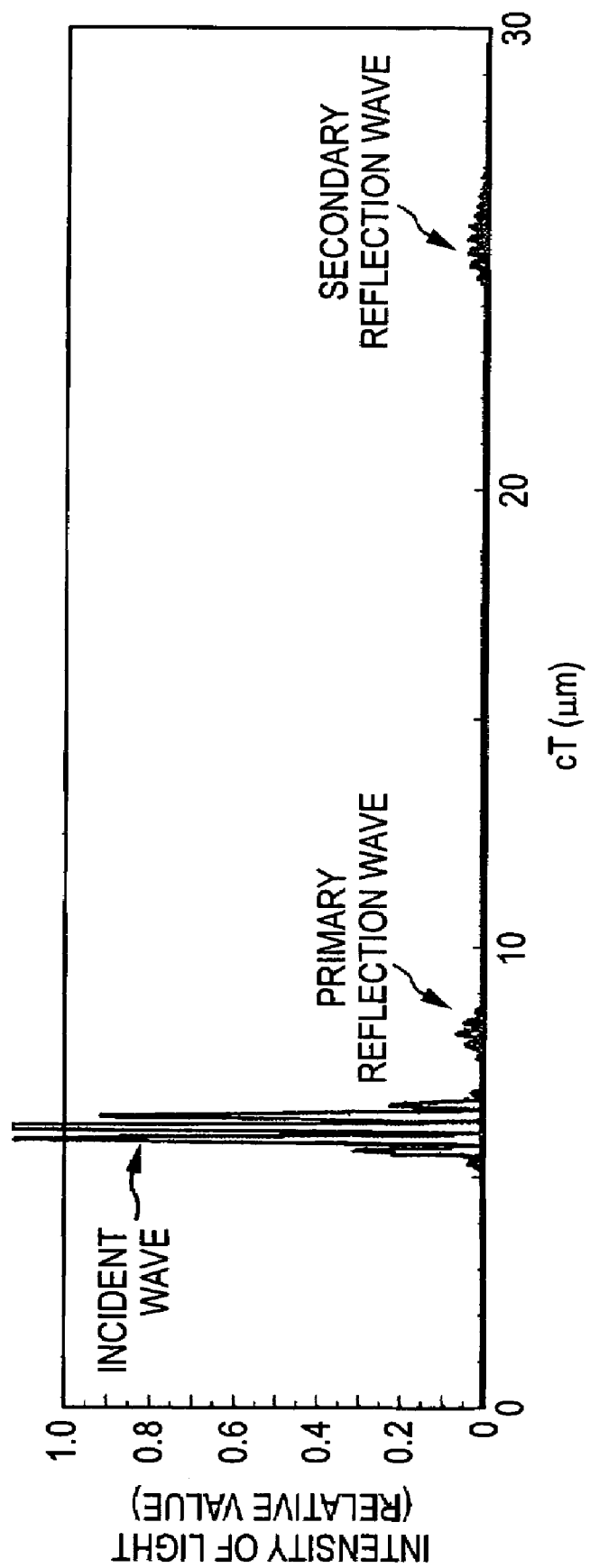
FIG. 25 is a graph showing a light intensity spectrum at the position of the monitor with a model for measuring reflection.
Figure 26:
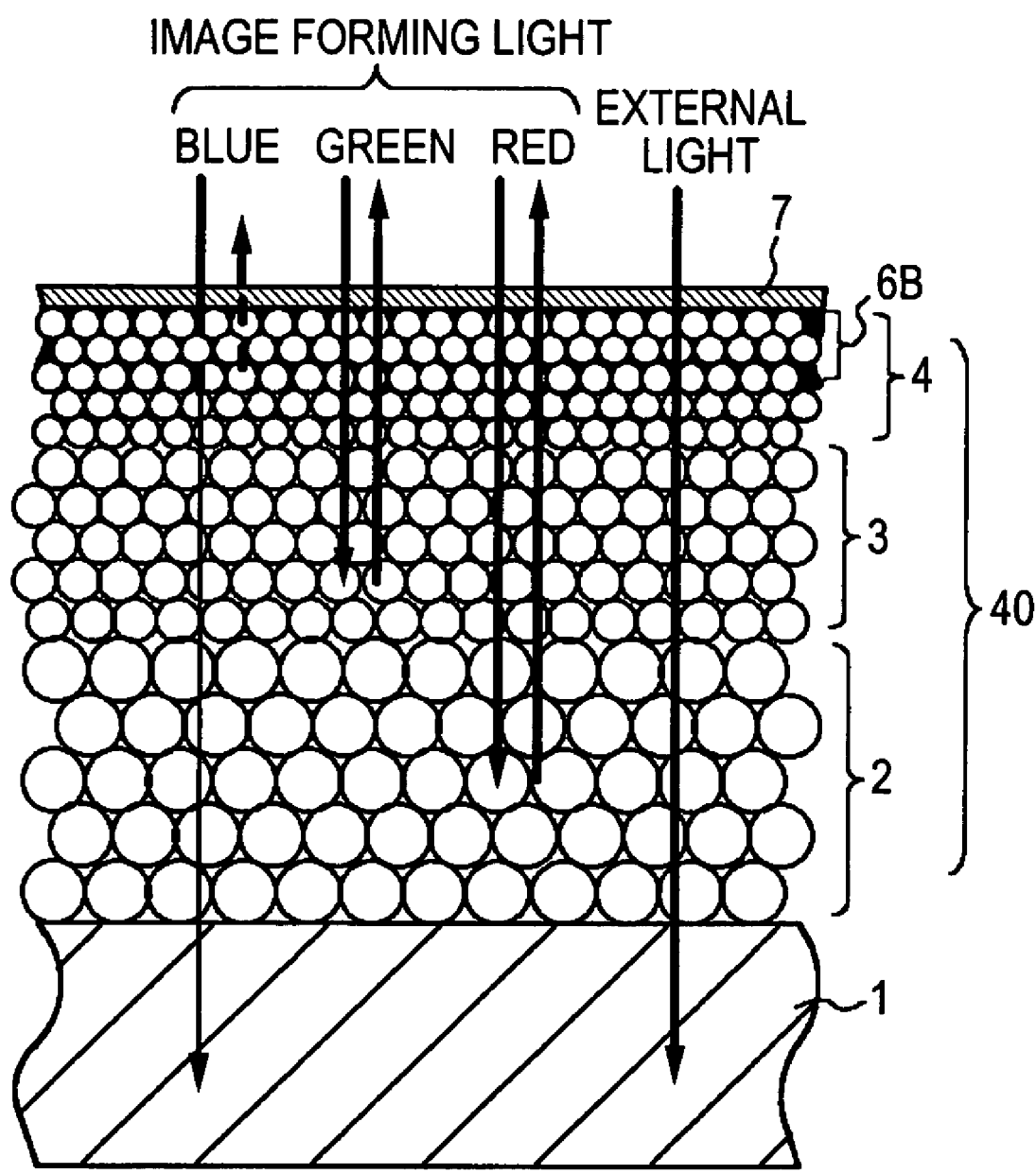
FIG. 26 is an enlarged schematic cross sectional view showing an important part of another reflective type screen.

Light reflection on the back surface of the diffusion film 7 is exemplified as a particular problem in a screen. This is caused by an air layer between the diffusion film 7 and the photonic crystal 40 as shown in FIG. 20. That is, light reflection occurs on the back surface of the diffusion film due to a large difference in refractive index between the diffusion film 7 (n=1.5 to 1.8) and the air (n=1.0). The problem is solved by filling the air layer with another material 60 having a refractive index equivalent to that of the diffusion film 7 as shown in FIGS. 1A and 1B.

As shown in FIG. 1A, for example, the air layer is filled with a polymer layer 60 containing a polymer shown in FIGS. 2A to 2C and 3, whereby transmission of light can be improved. According to the structure, light is substantially not reflected on the back surface of the diffusion film 7 but is effectively incident on the photonic crystal layer, and thus, only light of the three primary colors from the projector is selectively reflected, but other light is well absorbed, whereby an image having high contrast with pure black color can be obtained in a bright room. Furthermore, the polymer layer 60 also functions as a protective film for the photonic crystal layer, whereby peeling of the fine particle layer 40 or the fine particles thereof is suppressed, and the mechanical strength against bending stress, tensile stress and compression stress is improved, so as to provide high reliability.

Figure 1B:
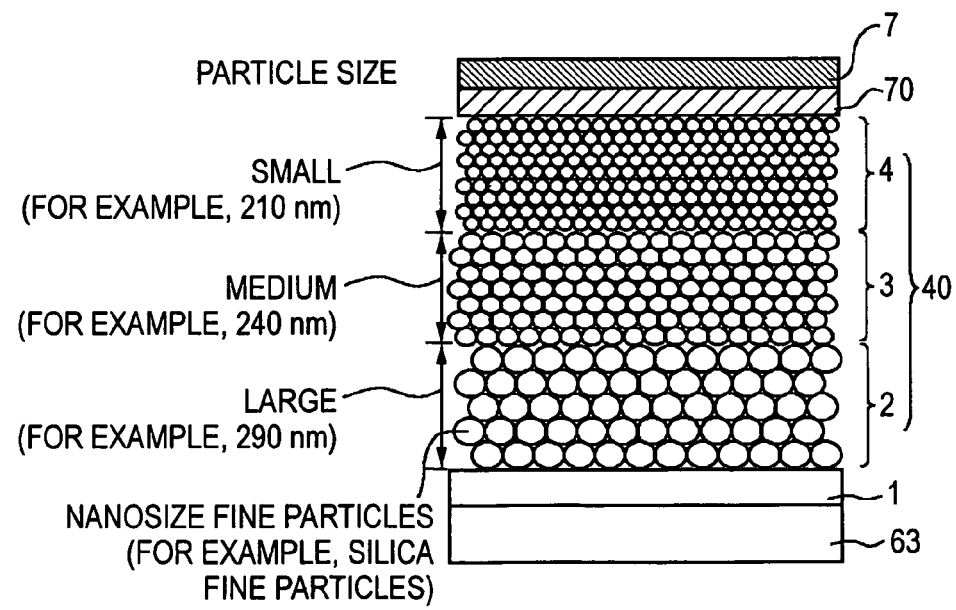

As shown in FIG. 1B, the penetration can be more effectively suppressed by providing a gelatin layer 70 having a molecular size that is equivalent to or larger than the polymer layer 60, for example, a molecular size of 1 mm or less.

In FIGS. 1A and 1B, a visible light absorbing material 1 and a fine particle layer 40 containing a red light reflective layer 2, a green light reflective layer 3 and a blue light reflective layer 4 are accumulated on a substrate 63, such as polyethylene terephthalate, as similar to the structure shown in FIG. 20.

The polymer layer 60 formed according to the invention may be formed by coating various kinds of polymer materials, such as an acrylic resin, polyvinyl alcohol (PVA) and gelatin, that satisfy the aforementioned conditions shown in FIGS. 2A to 5. The diffusion film 7 as a light diffusing layer may be a polyethylene film having light diffusing property (having a refractive index distribution within the plane due to the production process), and a polycarbonate film, a polyethylene terephthalate film and a polyvinyl chloride film that are processed to have unevenness on the surface ford if fusing light. The thickness of the light diffusion film is generally 5 mm or less, and preferably 1 mm or less.

A ¼ wavelength coating for preventing reflection may be provided on the surface of the diffusion film for further improving the optical characteristics. In this case, it is necessary to coat with a material having a refractive index lower than the refractive index of the film material. Specifically, for example, an $SiO_2$ glass film having a thickness of 100 nm is formed by coating or vapor deposition.

In the case where the light diffusing layer 7 is formed, for example, after forming the reflective layers 2 to 4 on the visible light absorbing material 1 as a substrate, the polymer layer 60 or the gelatin layer 70 is formed by coating on the surface of the blue light reflective layer 4, and then the diffusion film under tensile force is adhered by pressing onto the surface of the blue light reflective layer 4. In alternative, it is possible that the polymer layer 60 or the gelatin layer 70 is previously formed on the back surface of the diffusion film, and the diffusion film under tensile force is adhered by pressing onto the surface of the blue light reflective layer 4.

As the light diffusing layer 7, a microlens film having two-dimensional microlens arrays formed on the surface thereof may be used instead of the diffusion film.

An embodiment where the polymer layer 60 is formed as a protective film or a waveguide of a light functional element based on the invention will be described.

Figure 7:
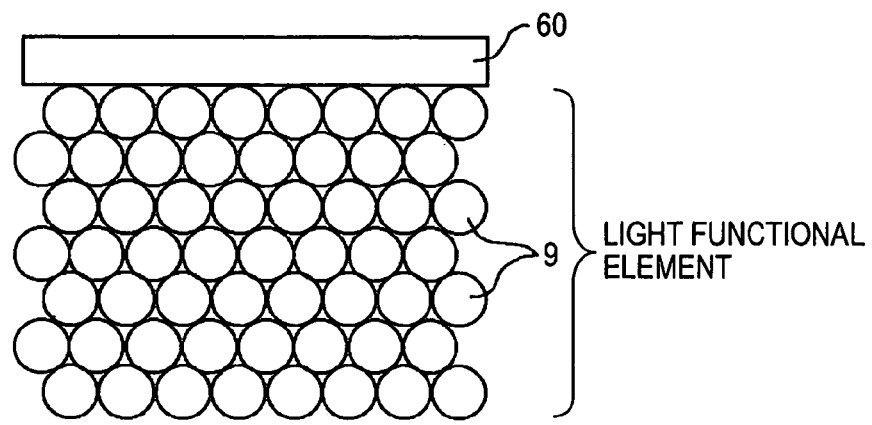
FIG. 7 is an enlarged cross sectional view showing an important part of an optical functional element according to an embodiment of the invention.

According to the invention, in the case as shown in FIG. 7 where a protective film 60 is formed on a light functional element having a photonic crystal, penetration of a polymer material into the gaps among fine particles 9 is suppressed, whereby the mechanical strength against bending, tensility and compression stress can be improved with substantially no change in light functional characteristics.

Figure 8A:
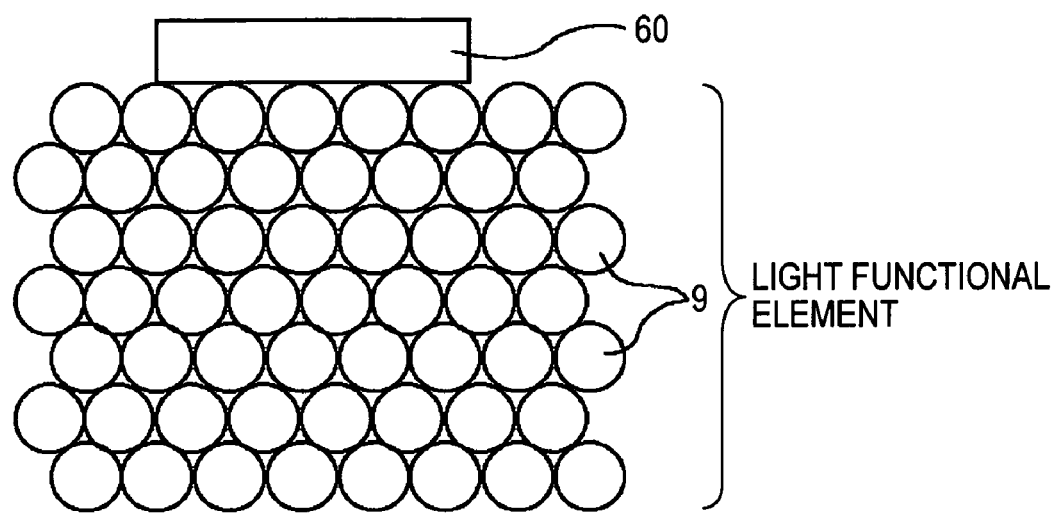
FIG. 8A is an enlarged cross sectional view showing an important part of another optical functional element according to an embodiment of the invention.
Figure 8B:
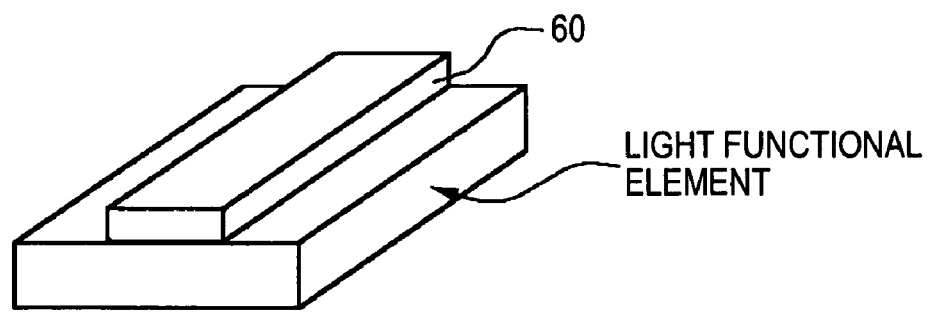
FIG. 8B is a perspective view thereof.

The case shown in FIG. 8 where a polymer waveguide 60 is formed on a light functional element having a photonic crystal 9, the same effect can be obtained. In this case, after coating and drying a polymer material satisfying the aforementioned conditions on the photonic crystal, the waveguide can be formed in such a manner that the prescribed part of the polymer film for the waveguide is shaped into a stripe form with a photoresist, and the other part thereof is removed by a chemical etchant or by dry etching.

The waveguide 60 can guide, for example, laser light, and a laser exciting medium is added to the fine particle layer, whereby leaked laser light is subjected to laser oscillation by exciting in an evanescent field, or the element is operated as an optical switching element by utilizing change in refractive index.

As described in the foregoing, in the case where the polymer material is coated as a protective film on a photonic crystal according to the invention, the material does not penetrate into the gaps of the photonic crystal in a large amount, and thus the optical characteristics, such as reflection characteristics, are not influenced. The provision of the protective film improves the mechanical strength against bending stress and tensile stress, and suppresses peeling and breakage of the fine particle layer.

In the case where the structure is applied to a reflective type screen, the photonic crystal layer can be directly covered with the polymer substance, and thus, there is no possibility that an air layer intervenes between the diffusion film and the photonic crystal layer. As a result, reflection of light on the back surface of the diffusion film is suppressed, and even in the case where external light having no relation to an image is incident on the screen, the contrast of the image is not deteriorated to provide a clear image having pure black color. Accordingly, it is not necessary that an image is projected in a dark room, but the contrast is not deteriorated under an ordinary fluorescent lamp or out of doors. At the same time, the mechanical strength against bending stress and tensile stress is improved, and peeling and breakage of the fine particle accumulated layer are reduced, so as to provide a screen with high reliability.

In the case where the structure is applied to a light functional element of a photonic crystal, the mechanical strength against bending, tensile and compression stress can be improved with substantially no change in light functional characteristics, or a polymer waveguide can be formed with substantially no change in light functional characteristics.

EXAMPLES

The invention will be described with reference to the following examples.

Reflective Type Screen

An aqueous dispersion containing silica fine particles having a uniform particle diameter of 240 nm for reflecting green light (silica content: 20% by mass) was prepared. The dispersion was coated on a polyethylene terephthalate (PET) substrate by the dipping method and then well dried to accumulate a fine particle layer having a thickness of from 1 to 2 μm. At this time, the fine particles were regularly arranged by self-assembly to form a photonic crystal. The measurement of the reflection spectrum of the sample revealed that it had a reflection peak around 540 nm.

Figure 9:
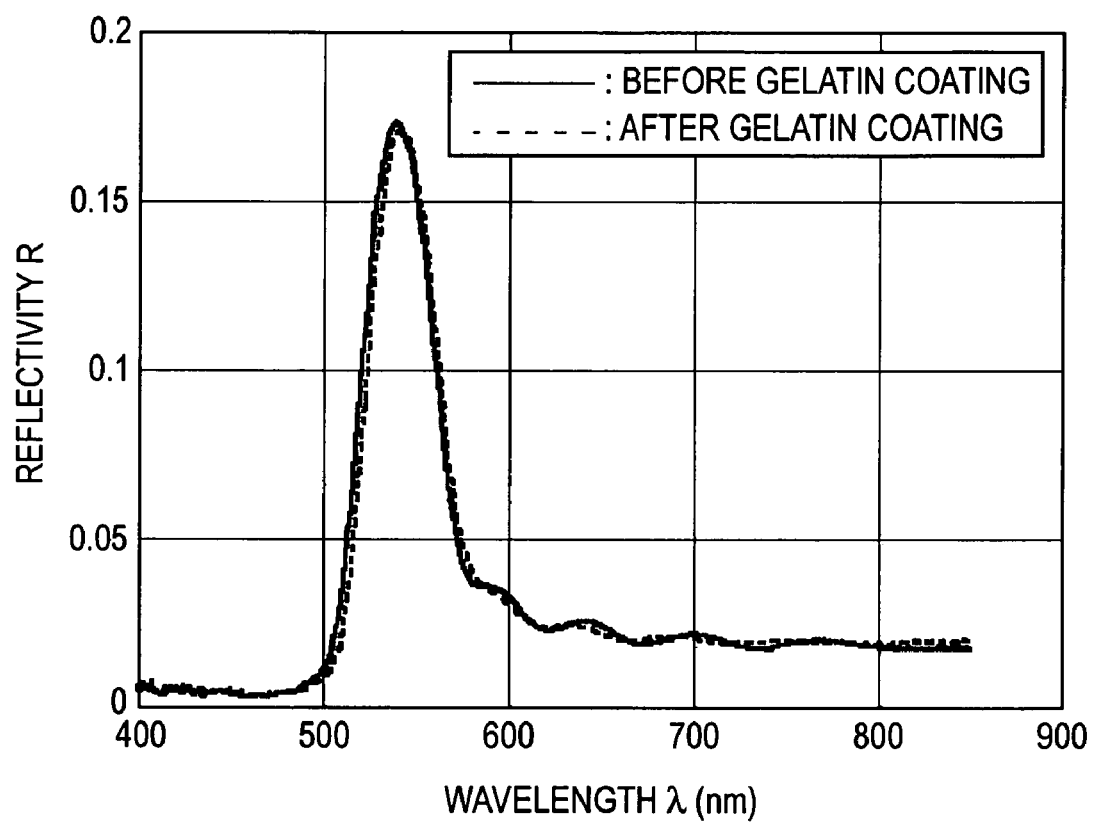
FIG. 9 is a graph showing reflection spectra of a reflective type screen according to an example of the invention.

Gelatin having a large molecular weight (molecular weight: about 100,000 or more) having a network structure was prepared and used as a protective film. 5 g of commercially available gelatin was dissolved in 100 mL of water to prepare a solution, and the solution was coated on the surface of the photonic crystal sample by the dipping method and then well dried. The gelatin had a molecular size of 1 mm or less. The reflection spectrum of the sample was measured before and after coating gelatin to investigate the influence of gelatin. The results obtained are shown in FIG. 9.

It was understood from the result that there is substantially no difference between the spectra before and after coating gelatin although the spectrum was slightly shifted to the long wavelength direction by about 2.5 nm. It was also confirmed that the mechanical strength against bending, tensile and compression stress was improved, and thus the photonic crystal layer was hard to be peeled.

Figure 10:
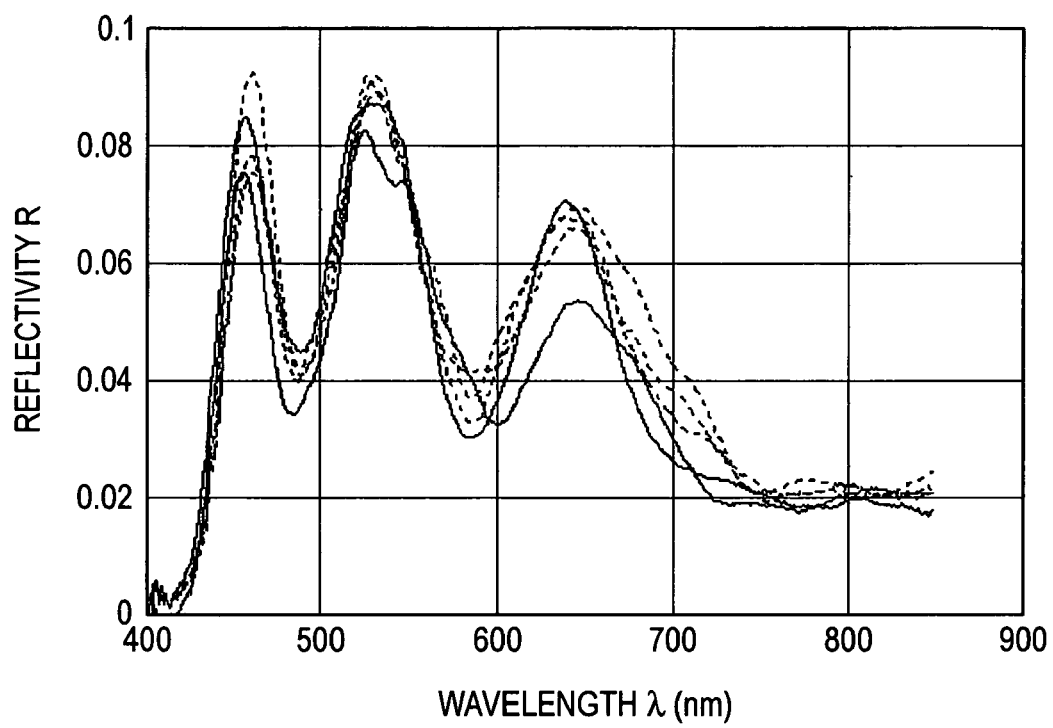
FIG. 10 is a graph showing reflection spectra of a full-color screen according to an example of the invention.
Figure 13A:
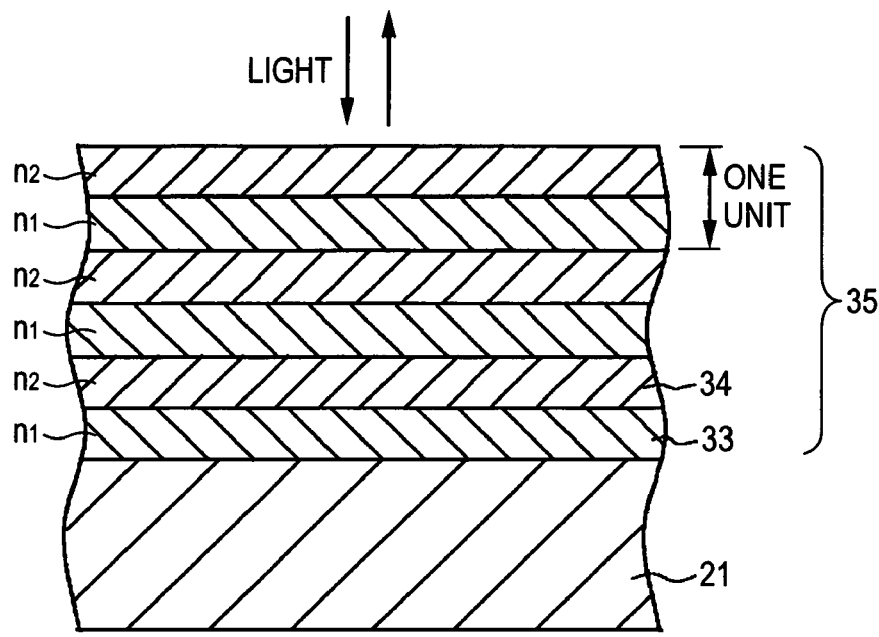
FIGS. 13A and 13B are schematic cross sectional views showing specific examples of a structure of such a reflective layer that selectively reflects light of a particular wavelength according to a preferred embodiment of the prior invention.
Figure 13B:
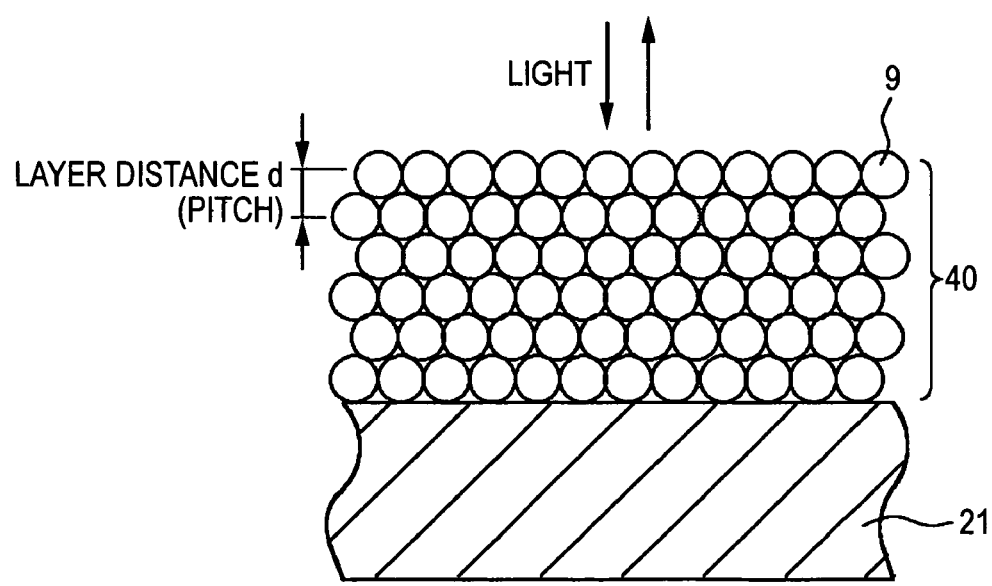
Figure 14:
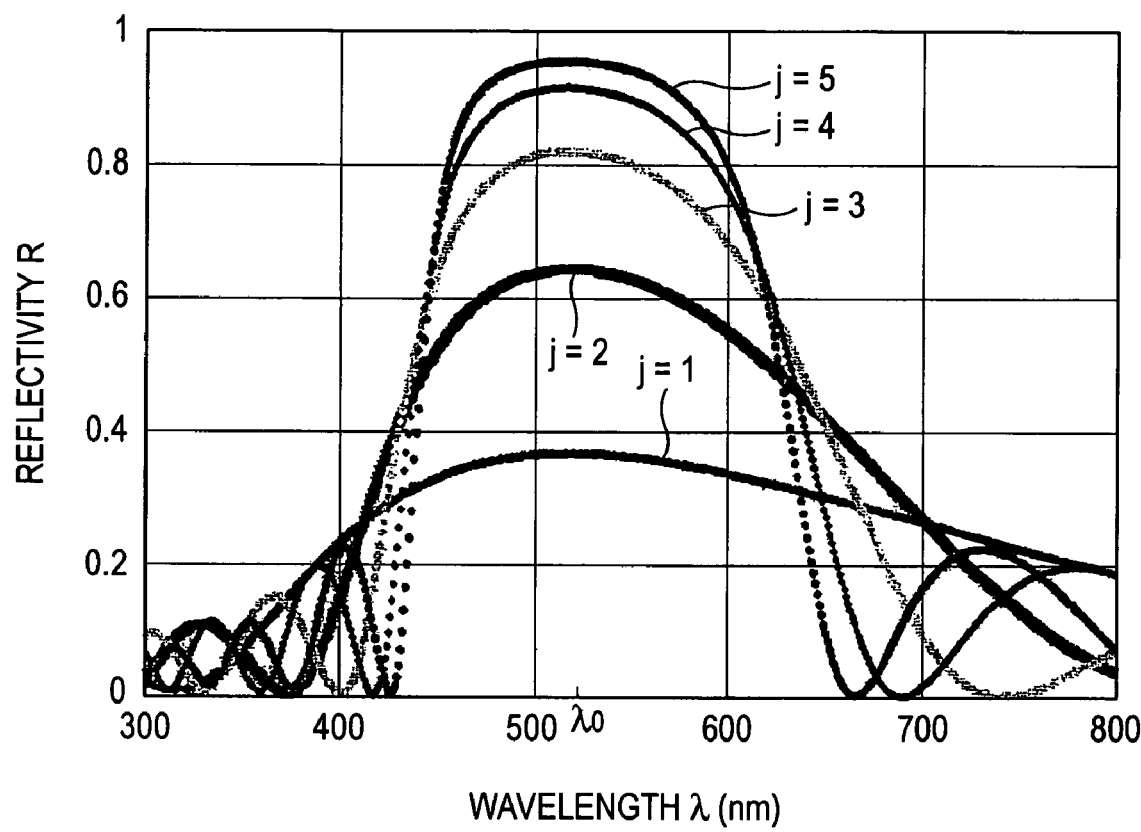
FIG. 14 is a graph showing calculation results of reflection spectrum of a dielectric layer estimated by the effective Fresnel coefficient method according to a preferred embodiment of the prior invention.
Figure 15:
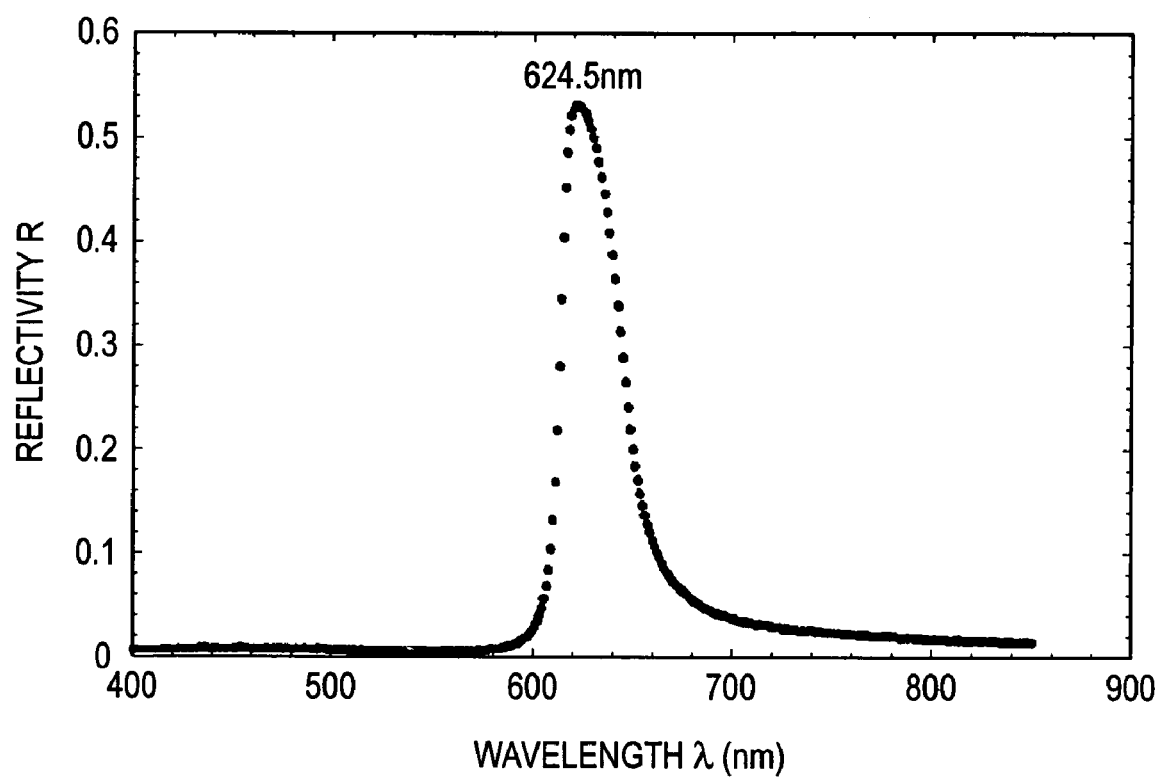
FIG. 15 is a graph showing a reflection spectrum of a film formed by accumulating layers of silica fine particle having a particle diameter of 280 nm formed by the self-assemble forming manner according to a preferred embodiment of the prior invention.
Figure 16A:
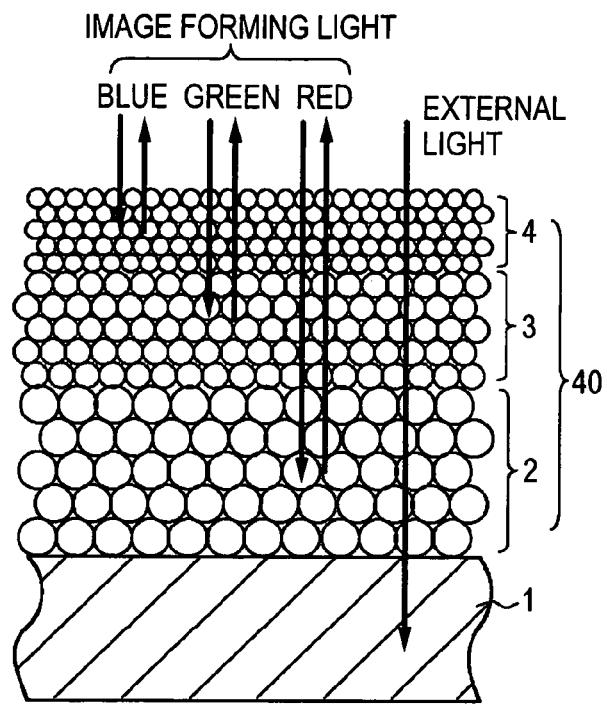
FIGS. 16A and 16B are enlarged schematic cross sectional views of important parts of basic structures of a reflective type screen that reflects only light of the three primary colors according to a preferred embodiment of the prior invention.
Figure 16B:
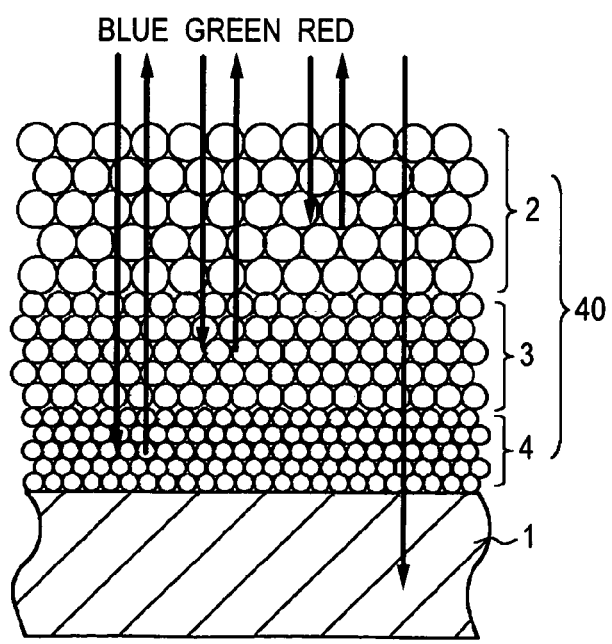
Figure 17:
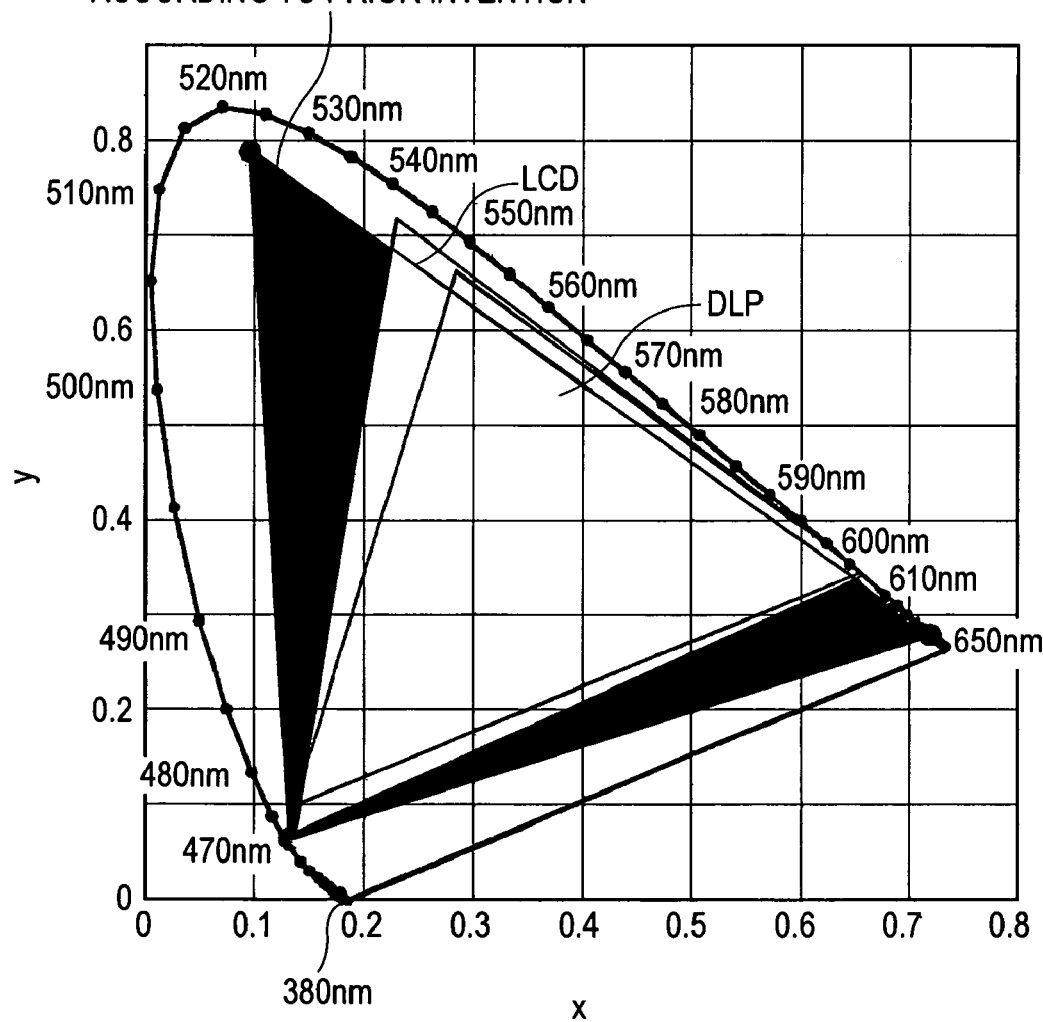
FIG. 17 is a graph showing a chromaticity diagram demonstrating the fact that the color reproducibility range is improved by using a reflective type screen according to a preferred embodiment of the prior invention.
Figure 18A:
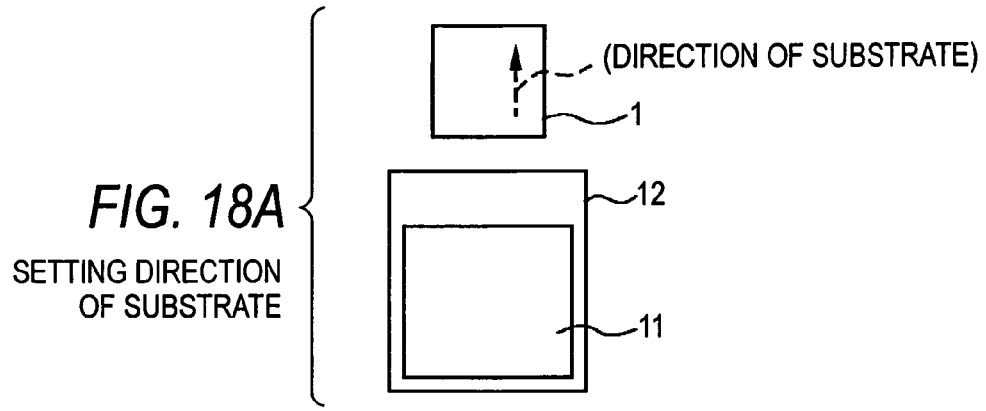
FIG. 18 is a flow chart showing a process for forming a fine particle layer-according to a preferred embodiment of the prior invention.
Figure 18B:
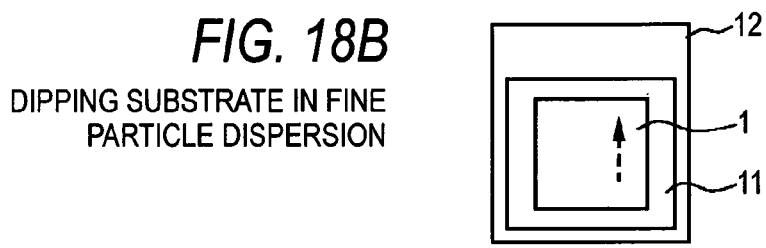
Figure 18C:
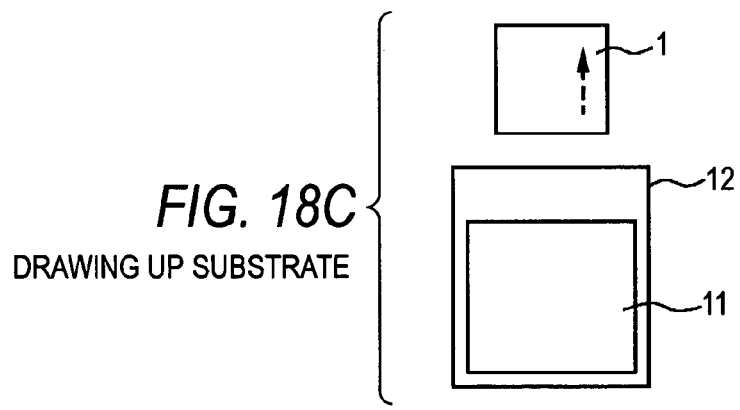
Figure 18D:
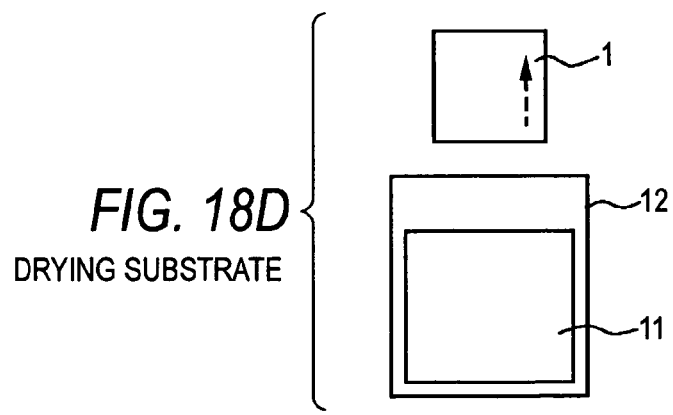
Figure 19:
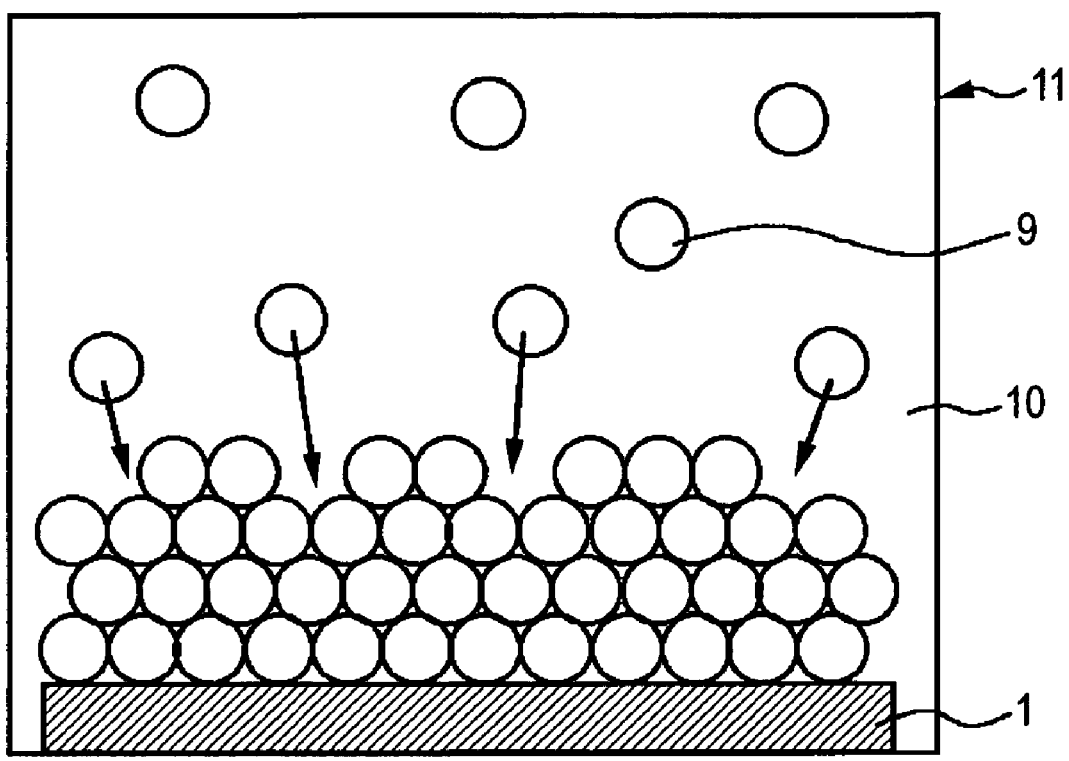
FIG. 19 is an enlarged schematic cross sectional view showing another process for forming a fine particle layer according to a preferred embodiment of the prior invention.

A full-color reflective type screen was then produced by using the structure. Photonic crystal layers for reflecting light of the three primary colors from a projector were accumulated on a black PET substrate in the order of red, green and blue by the dipping method. The particle diameters of the silica fine particles were 290 nm, 240 nm and 210 nm, respectively. At this time, the surface of the PET substrate had been roughened by sand matting processing to improve wettability. Furthermore, the aforementioned gelatin was coated on the blue light reflective layer by the dipping method and then well dried. The reflection spectrum was measured before and after coating gelatin to investigate the influence of gelatin. The results obtained are shown in FIG. 10.

It was understood from the result that there is substantially no difference between the spectra before and after coating gelatin. It was also confirmed that the mechanical strength against bending, tensile and compression stress was improved, and thus the fine particle layer was hard to be peeled.

A diffusion film was adhered on the sample to produce the structure shown in FIG. 1B. As a result of projection of an image on the screen having the structure with a projector, it was found that light reflection on the back surface of the diffusion film was suppressed, and therefore, even in the case where external light having no relation to the image was incident on the screen, the contrast of the image was not deteriorated to provide a clear image having pure black color. Furthermore, it was confirmed that deterioration in contrast was suppressed under an ordinary fluorescent lamp or out of doors.

Light Functional Element

An aqueous dispersion containing silica fine particles having a uniform particle diameter of 290 nm (silica content: 20% by mass) was prepared. The dispersion was placed in a vessel and dried, whereby the silica fine particles sedimented and accumulated to produce a photonic crystal. In the case where light was incident on the crystal in varying directions, the crystal became an element having light functional characteristics where the Bragg wavelength was changed (spectroscopic function), or the gap energy of the photonic band was changed.

A waveguide was formed on the element by using gelatin. As shown in FIG. 11, a solution prepared by dissolving 5 g of gelatin in 100 mL of water was coated on the surface of the light functional element by the dipping method, followed by well drying. A photoresist was then coated thereon by the spin coating method and well dried, and the photoresist is shaped into a stripe form with a mask aligner by exposure and development. The part of the gelatin layer having no photoresist thereon was selectively dissolved and removed with water at 70° C. Finally, the photoresist was dissolved and removed with an alcohol solvent.

The waveguide formed with gelatin was formed on the light functional element of a photonic crystal, whereby light was introduced into the waveguide to subject to spectroscopy or Bragg diffraction. Accordingly, a new light functionality, such as photo amplification could be attained through induced emission.

The embodiments and the examples of the invention having been described herein may be subjected to various changes and modifications based on the technical spirits of the invention.

In the invention as described in the foregoing, when a layer, such as a protective film, is formed on a fine particle accumulated layer, such as a photonic crystal, the material of the layer does not penetrate into gaps among the fine particles in a large amount because the material of the layer has a size larger than the gaps among the fine particles. Therefore, the mechanical strength against bending stress and tensile stress can be improved, and peeling and breakage of the fine particle accumulated layer can be suppressed, without adverse affect of the layer on the optical characteristics, such as reflection characteristics.

What is claimed is:

1. A fine particle structure comprising a fine particle accumulated layer having fine particles arranged and accumulated, having provided thereon a layer comprising a molecule having a size larger than gaps among the fine particles wherein:

(a) the fine particle accumulated layer is a photonic crystal layer comprising fine particles which have uniform size and are regularly arranged;
    (b) the layer comprising a molecule having a size larger than gaps among the fine particles is a coating comprising a polymer substance having a size larger than the gaps among the fine particles; and
    (c) the size of the gaps is [equation 1]

$$2(\sqrt{2}-1)R$$

wherein R represents a radius of the fine particles.

2. A fine particle structure as claimed in claim 1, wherein the polymer substance comprises a chain polymer, a linear polymer or a helix polymer, and the size is a length in a major length direction of the polymer substance.

3. A fine particle structure as claimed in claim 1, wherein the polymer substance comprises a chain polymer, a linear polymer or a helix polymer, and the size is a length in a minor length direction of the polymer substance.

4. A fine particle structure as claimed in claim 1, wherein the polymer substance is in a coil form, and the size is a length in a longitudinal direction of the coil.

5. A fine particle structure as claimed in claim 1, wherein the polymer substance is in a coil form, and the size is a length in a lateral direction of the coil.

6. A fine particle structure as claimed in claim 1, wherein the polymer substance comprises a network polymer or a gel polymer, and the size is a size of the network in a spreading direction.

7. A fine particle structure as claimed in claim 1, wherein the polymer substance comprises gelatin.

8. An optical medium comprising a fine particle structure of claim 1.

9. An optical medium as claimed in claim 8, wherein the layer comprising a molecule having a size larger than gaps among the fine particles is provided as a protective film of a reflective type screen.

10. An optical medium as claimed in claim 8, wherein the optical medium is constituted as a light functional element.

11. An optical medium as claimed in claim 10, wherein the molecular layer is formed as a protective film.

12. An optical medium as claimed in claim 10, wherein the molecular layer is formed as a waveguide.

13. The optical medium of claim 8, wherein the polymer substance comprises gelatin.

* * * * *